US007934428B2

(12) United States Patent
Schultz et al.

(10) Patent No.: US 7,934,428 B2

(45) Date of Patent: May 3, 2011

(54) RESIDUAL TORQUE ANALYZER

(75) Inventors: James P. Schultz, Plymouth, MN (US); Franklin I. Skog, Shoreview, MN (US); David A. Tait, Apple Valley, MN (US); Steven D. Erickson, Plymouth, MN (US); Cecil H. Nelson, Chanhassen, MN (US)

(73) Assignee: ASI DataMyte, Inc., Plymouth, MN (US)

( * ) Notice: Subject to any disclaimer, the term of this patent is extended or adjusted under 35 U.S.C. 154(b) by 299 days.

(21) Appl. No.: 12/235,263

(22) Filed: Sep. 22, 2008

(65) Prior Publication Data

US 2009/0078057 A1 Mar. 26, 2009

Related U.S. Application Data

(60) Provisional application No. 60/994,624, filed on Sep. 20, 2007, provisional application No. 60/994,837, filed on Sep. 21, 2007, provisional application No. 60/995,021, filed on Sep. 24, 2007.

(51) Int. Cl.
*F16B 31/02* (2006.01)

(52) U.S. Cl. .......................................................... 73/761

(58) Field of Classification Search .................... 73/761, 73/862.21–862.23

See application file for complete search history.

(56) References Cited

U.S. PATENT DOCUMENTS 2,791,141 A * 5/1957 Johnson et al. ................. 81/481
3,769,860 A * 11/1973 Frings et al. .................... 81/429
3,962,910 A 6/1976 Spyridakis et al.
4,142,591 A * 3/1979 Himmelstein ................ 173/182
4,244,213 A 1/1981 Marcinkiewicz
4,316,512 A * 2/1982 Kibblewhite et al. .......... 173/183
4,319,494 A 3/1982 Marcinkiewicz
4,375,123 A 3/1983 Ney
4,397,196 A 8/1983 Lemelson
4,426,887 A 1/1984 Reinholm et al.

(Continued)

FOREIGN PATENT DOCUMENTS

JP 6137975 A 5/1994

(Continued)

OTHER PUBLICATIONS

PCT Written Opinion dated Apr. 13, 2009 for PCT/US2008/077228 filed Sep. 22, 2008.

*Primary Examiner* — Lisa M Caputo

*Assistant Examiner* — Octavia Davis

(74) *Attorney, Agent, or Firm* — Patterson Thuente Christensen Pedersen, P.A.

(57) ABSTRACT

A system for detecting fastener movement and measuring a residual torque in a fastener joint, including a device for applying torque to a stationary fastener in a tightened state and measuring torque and angle of rotation. The device includes a sensing system that has a gyroscope that provides a signal corresponding to the angle of rotation of the device as it applies torque to the fastener, and a torque transducer that provides a signal corresponding to the torque applied to the fastener by the device. The device also includes a computing unit in communication with the sensing system and adapted to receive the signal corresponding to an angle of rotation of the device and the signal corresponding to the torque applied to the fastener, and determine a torque at a moment of initial movement of the fastener.

25 Claims, 17 Drawing Sheets

U.S. PATENT DOCUMENTS

| | | | | |
|---|---|---|---|---|
| 4,450,727 | A | 5/1984 | Reinholm et al. | |
| 4,643,030 | A | 2/1987 | Becker et al. | |
| 4,768,388 | A | 9/1988 | Fader et al. | |
| 4,961,035 | A * | 10/1990 | Inaba et al. | 318/600 |
| 5,476,014 | A | 12/1995 | Lampe et al. | |
| 5,589,644 | A * | 12/1996 | Becker et al. | 73/862.23 |
| 6,609,407 | B1 | 8/2003 | Tambini | |
| 6,698,298 | B2 | 3/2004 | Tsuji et al. | |
| 6,782,594 | B2 | 8/2004 | Shoberg | |
| 6,965,835 | B2 * | 11/2005 | McGee et al. | 702/41 |
| 7,284,451 | B2 | 10/2007 | Cupif et al. | |
| 7,556,103 | B2 * | 7/2009 | Matsunaga | 173/2 |
| 7,565,844 | B2 * | 7/2009 | Crass et al. | 73/862.21 |
| 2006/0241815 | A1 | 10/2006 | Carlin et al. | |

FOREIGN PATENT DOCUMENTS

| | | | |
|---|---|---|---|
| JP | 2001009748 | A | 1/2001 |

* cited by examiner

RESIDUAL TORQUE ANALYZER

RELATED APPLICATION

This application claims the benefit of: U.S. Provisional Application No. 60/994,624, entitled IMPROVED RESIDUAL TORQUE MEASUREMENT, filed Sep. 20, 2007; U.S. Provisional Application No. 60/994,837, entitled TORQUE WRENCH WITH ANALOG OR DIGITAL OUTPUT CAPABILITY, filed Sep. 21, 2007; and U.S. Provisional Application No. 60/995,021, entitled TORQUE ANALYZER SYSTEM, filed Sep. 24, 2007, all of which are incorporated herein in their entirety by reference.

FIELD OF INVENTION

The invention relates generally to residual torque detection and analysis. More specifically, the invention relates to devices, systems and methods relating to measuring residual torque in a previously-tightened fastener by detecting fastener motion.

BACKGROUND OF THE INVENTION

Residual torque may be defined as the torque that remains on a threaded fastener after it has been tightened, and is typically measured by applying torque to the previously-tightened fastener and observing the behavior of the fastener. This is usually performed with a hand-operated torque wrench. The purpose of residual torque measurement may be to assess the performance of a power tool that previously fastened a given joint, or to simply determine whether the torque on a given joint is sufficient for its intended purpose. For example, an under-torqued fastener may vibrate or work loose. Conversely, if tension is too high, the fastener can snap or strip its threads.

Even with the advent of precise instrumented power tools, the need to measure or audit residual torque remains important for many reasons. First, there are dozens of sources of error that could cause an instrumented tool, one that initially indicated correct installation torque, to subsequently apply low actual joint torque. For example something as simple as a cracked socket can throw off targeted applied torque. In another example, a longer-than-normal extension used with a tightening tool may introduce error. The longer extension absorbs more rotational energy intended for the joint as compared to a shorter extension, thus lowering actual applied torque. Power tools in particular create variability by their very nature—high speed, constant motion, and high volume. As the gears in the right-angle drive of a power wrench collect dirt and wear, increasing friction absorbs torque and the sensor in the tool picks up less than accurate readings.

A second reason to precisely measure residual torque is the high cost of failure for many joints. Improper torque in safety-critical applications, such as steering gears or braking assemblies, can result in significant equipment damage, human injury, or even death. As recalls attributable to improper torque in the automotive industry and other industries continue, it would seem the need to resolve torque issues carries more weight than ever.

A number of torque measurement technologies and methodologies already exist, including measuring peak torque, detecting breakaway inflection points, and predetermining capture angles.

Assessing residual torque by means of a peak measurement strategy may be the oldest and most widely employed methodology today. Typically, peak-torque wrenches use a simple indicating dial to measure peak torque. In order for these devices to effectively and accurately measure residual torque, though, a significant amount of operator training and practice is required. Proper operation requires the operator to slowly and deliberately apply ever-increasing torque until the fastener just begins to move, and then release pressure. This slow approach is an attempt to reduce the amount of overshoot after the fastener starts to turn. For example, the torque-time curve of FIG. 1 depicts a peak torque of 55 Nm at approximately 1,250 milliseconds.

One such peak-torque device is described in U.S. Pat. No. 4,643,030 (Becker et al.), "Torque Measuring Apparatus". Becker et al. discloses a torque wrench that includes a strain gauge in communication with a peak-hold circuit. The output of the strain gauge is held by a peak detector such that the maximum torque detected by the torque wrench is captured and displayed to a user.

The tendency to overshoot is central to many of the problems associated with using a simple peak-reading device, such as the one disclosed in Becker et al., to measure residual torque. Contributing to the problem are individual differences in human reaction time. An operator with quick reaction time tends to take lower readings than an operator with slower reaction time. Slower reaction time results in greater overshoot. In addition, since torque auditors typically take several hundred measurements in a shift, inconsistencies may creep into the process. Fatigue may cause a weaker pull on the wrench, or pressure to meet a schedule may lead to a quicker pull and greater overshoot. An example of overshoot is depicted in FIG. 2. In this example, an overshoot of only about 150 milliseconds resulted in a peak reading more than 10% higher than the torque applied at the start of fastener rotation.

While excessive overshoot creates false high readings using a peak-reading device, releasing the wrench before the fastener begins to turn causes false low readings. This all-too-common occurrence is usually triggered when a bump or vibration in the work piece is mistaken for fastener rotation. These false apparent indications of fastener rotation are more common when the work piece is in motion, as on an assembly line.

Even if it were possible to stabilize these sources of variance, the peak residual torque method remains inherently flawed. It measures torque at the point where the operator stops pulling on the wrench. This may occur before the fastener turns, shortly after the fastener turns, or significantly after the fastener turns. Lack of accuracy has a cost. Peak residual torque measurements are often so questionable that managers end up taking multiple measurements attempting to determine whether a torque problem really exists rather than taking corrective action with the fastening system.

Other known methods attempt to detect breakaway torque, or the torque required to overcome static friction, by looking for inflection points in the torque-time curve. These methods leverage the fact that resistance to the wrench changes at the point where static friction has been overcome. The torque-time curve of FIG. 3 depicts the capture of a torque-time breakaway point. In the hands of a skilled and very careful operator, torque-time breakaway detection can produce better quality measurements in less time than those taken using previously described peak measurement techniques.

For example, U.S. Pat. No. 4,426,887 (Reinholm et al.), "Method of Measuring Previously Applied Torque to a Fastener," discloses a digital torque wrench and a method for detecting breakaway inflection points in a torque-time curve. The method looks for a breakaway inflection point by examining and storing progressively increasing torque values until detecting successive decreasing torque values. The point at which the torque values turn negative indicates a breakaway inflection point.

Though faster, torque-time breakaway inflection detection, such as that described in Reinholm et al., presents the user with challenges. Inflection points in the torque-time curve can easily be caused by operator hesitation, resulting in false low readings. Conversely, well-lubricated soft joints may produce very little or no detectable inflection at fastener motion. The torque-time curve of FIG. 4 depicts an example of a fastener with very little inflection in the torque-time curve at the start of fastener rotation.

The introduction of the solid state gyroscope has facilitated development of residual torque measurement devices that incorporate the use of sensed angular displacement as a qualifier for the capture of a torque value. One such method is referred to as the "capture angle" or "torque at angle" method, which captures torque at a predetermined degree of sensed angular rotation.

Using the capture-angle method, the residual torque for any given joint is the reading taken after some degree of sensed angular rotation past a torque threshold that includes both windup and actual fastener rotation. Windup, also known as flex, is understood to be the sensed angular motion due to the inherent metallic elasticity in the wrench, drive, extension, socket, fastener, and work piece. The amount of windup may vary considerably from joint to joint for a given assembly type, making it difficult to accurately determine an appropriate capture angle. This remains especially true for complex joint assemblies. For example) FIGS. 5*a* and 5*b* depict torque-angle curves for two different joints of a light truck assembly. In FIG. 5*a*, the amount of windup is less than one degree, yet for the same type of assembly, another joint demonstrates well over six degrees of windup.

With this variability in mind, to determine capture angle, typically, an engineer makes a best guess based on the materials used, their properties, the type of joint and anticipated windup before fastener rotation begins. Going forward, torque capture angle is often adjusted using some number of residual measurements and comparing them to in-line installation measurements. As such, the capture angle method tends to rely on trial-and-error techniques, and remains fairly subjective.

In one variation of the capture angle method, U.S. Pat. No. 6,698,298, "Torque Wrench for Further Tightening Inspection" (Tsuji et al.) discloses a gyroscope-based torque wrench and method of measuring torque. In Tsuji et al., the disclosed torque wrench measures torque and angle data, and combines the measured data with predetermined, referential torsion characteristics of the wrench and work piece. The method of Tsuji et al. stores into read-only memory a predefined reference torque-angle line that attempts to characterize the behavior of the wrench, including windup or flex, and relies on these predefined characteristics to extrapolate and estimate torque-angle slope intersections.

One problem with predefining wrench and work piece characteristics is that flex varies across wrench and work piece components, which creates variation in the windup slope from wrench to wrench and application to application. However, the method of Tsuji et al. assumes a constant, known characteristic and calculates slopes accordingly, in advance. This problem is exacerbated with high static friction joints where the slope of the torque-angle curve after restart is steepest. Furthermore, the method of Tsuji et al. remains highly affected by the non-rigidity, or softness, of the work piece.

SUMMARY

In one embodiment, the present invention is a system for detecting fastener movement and measuring a residual torque in a fastener joint, including a device for applying torque to a stationary fastener in a tightened state and measuring torque and angle of rotation. The device includes a sensing system that has a gyroscope that provides a signal corresponding to the angle of rotation of the device as it applies torque to the fastener, and a torque transducer that provides a signal corresponding to the torque applied to the fastener by the device.

The device also includes a computing unit in communication with the sensing system and adapted to receive the signal corresponding to an angle of rotation of the device and the signal corresponding to the torque applied to the fastener, and determine a torque at a moment of initial movement of the fastener Determining initial movement of the fastener includes determining a base torque, calculating rates of change in torque over change in angle, and calculating differences between the rates to detect fastener movement, thereby differentiating between sensed motion caused by flex in the device, socket, fastener, work piece, and/or extension, and actual fastener rotation.

In another embodiment, the present invention includes a method of measuring residual torque in a previously tightened fastener. The method includes applying torque to a previously tightened fastener using a device adapted to measure applied torque and angular motion, and measuring torque applied to the fastener at multiple sensed angular positions to obtain a set of torque-angle data points.

A base slope for at least one of the torque-angle data points is determined, where the base slope is defined as a change in torque over a change in angle for the torque-angle data point as compared to a base point. A forward slope for the torque-data point is also determined, where the forward slope is defined as a change in torque over a change in angle for a point subsequent to the torque-angle data point and the torque-angle data point itself.

A slope delta for the torque-angle data point is then determined where the slope delta may be defined as a rate of change between the forward slope and the base slope. The slope L delta of the torque-angle data point is compared to a minimum slope delta, thereby obtaining an indication of a rate of change of torque per unit of angular motion of the torque-angle data point as compared to the set of torque-angle data points.

Accordingly, the present invention provides a number of advantages over the prior art devices and methods described above. First, torque is captured at the precise moment static friction is overcome and the fastener begins to rotate (the breakaway point). In some embodiments, torque is captured at the moment the fastener begins to tighten after rotation (the restart point).

Further, the present invention is equally effective across all joint types, unlike known methods, including the capture angle method, and does not require estimating joint, work piece, or fastener characteristics in advance. As such, devices and methods of the present invention more fully capture the effect of material failure.

Additionally, embodiments of devices and systems of the present invention rely on a solid-state gyroscope to precisely capture angle data, and though all solid-state gyroscopes tend to drift over time, methods of the present invention remain immune to such drift error. Conversely, drift error in capture angle systems affect measured torque values, in contrast to methods of the present invention that effectively cancel out such drift error through torque rate comparison techniques.

BRIEF DESCRIPTION OF THE DRAWINGS

The invention may be more completely understood in consideration of the following detailed description of various embodiments of the invention in connection with the accompanying drawing, in which.

Figure 1:
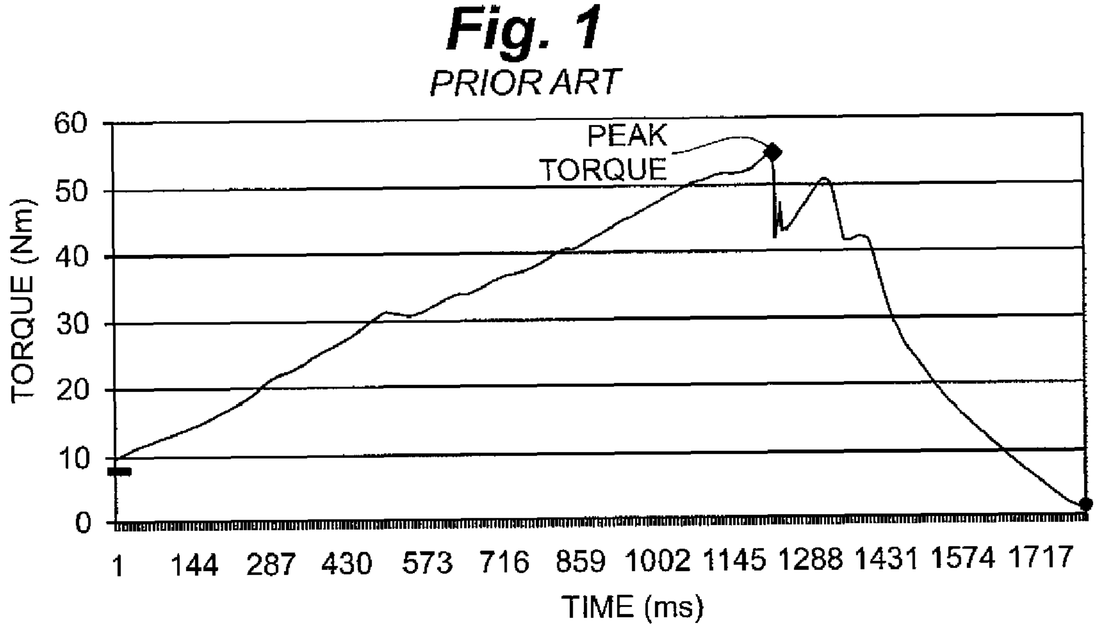
Fig. 1 PRIOR ART
FIG. 1 is a torque-time curve depicting a peak-torque point as measured using the prior art technique of peak-torque measurement.
Figure 2:
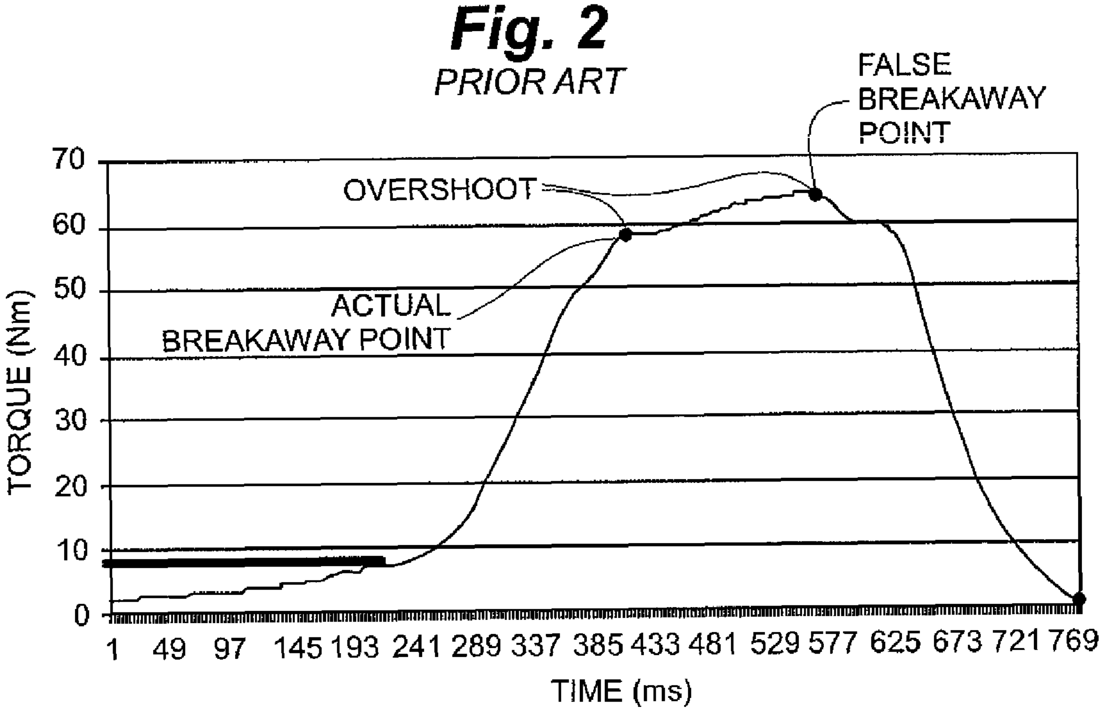
Fig. 2 PRIOR ART
FIG. 2 is a torque-time curve depicting overshoot of residual torque using the prior art technique of peak-torque measurement.
Figure 3:
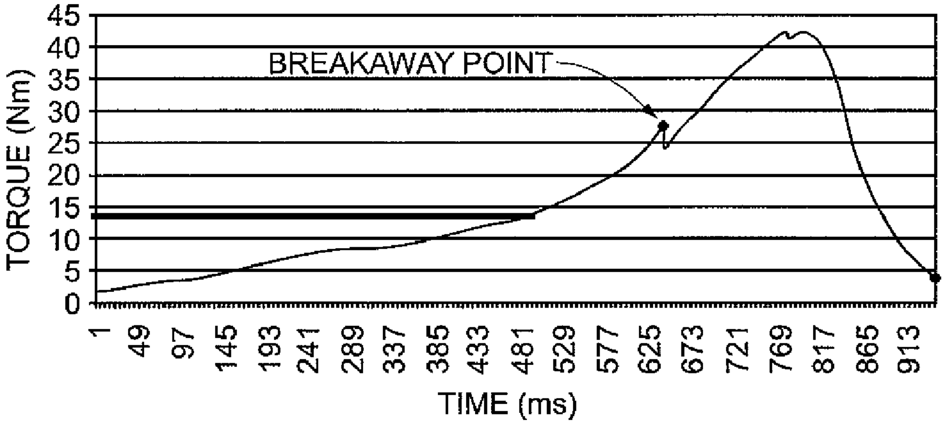
Fig. 3 PRIOR ART
FIG. 3 is a torque-time curve depicting a torque-time breakaway data point.
Figure 4:
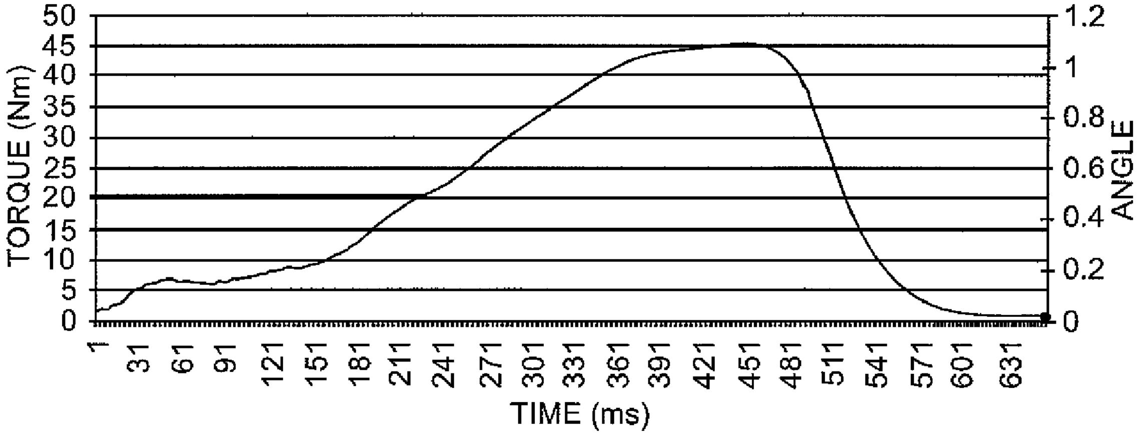
Fig. 4 PRIOR ART
FIG. 4 is a torque-time curve of a fastener joint with minimal inflection at the point of fastener rotation.
Figure 5A:
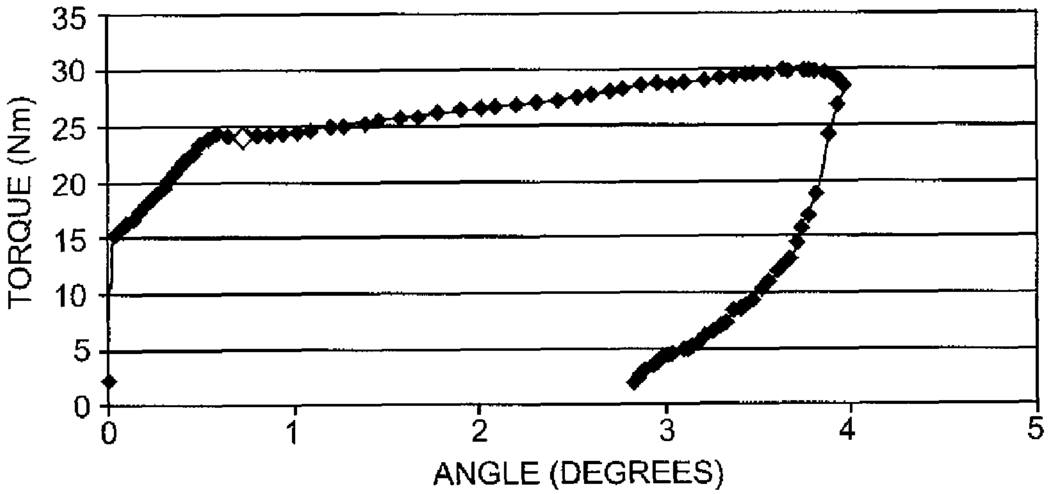
FIG. 5*a* is torque-angle curve of a fastener joint having a relatively small angular wind up.
Figure 5B:
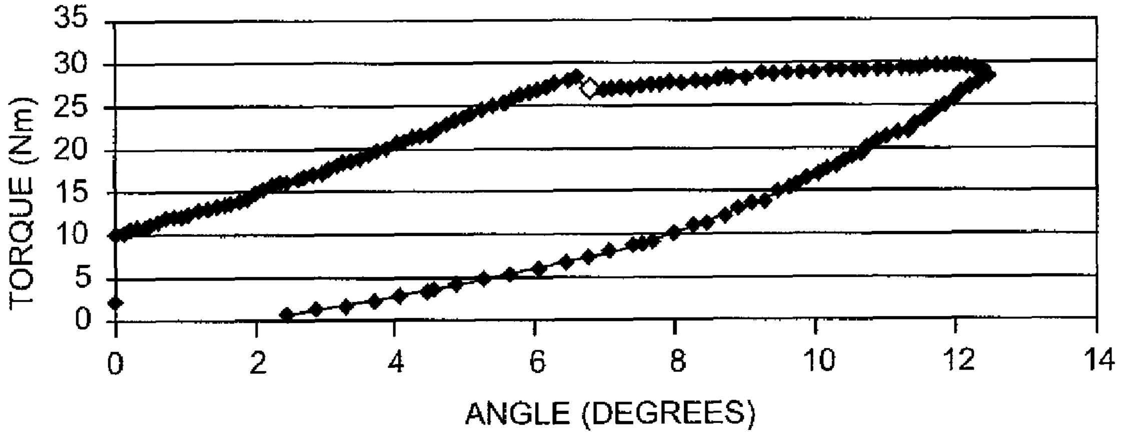
FIG. 5*b* is a torque-angle curve of fastener joint having a relatively large angular wind up.

While the invention is amenable to various modifications and alternative forms, specifics thereof have been shown by way of example in the drawings and will be described in detail. It will be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 6:
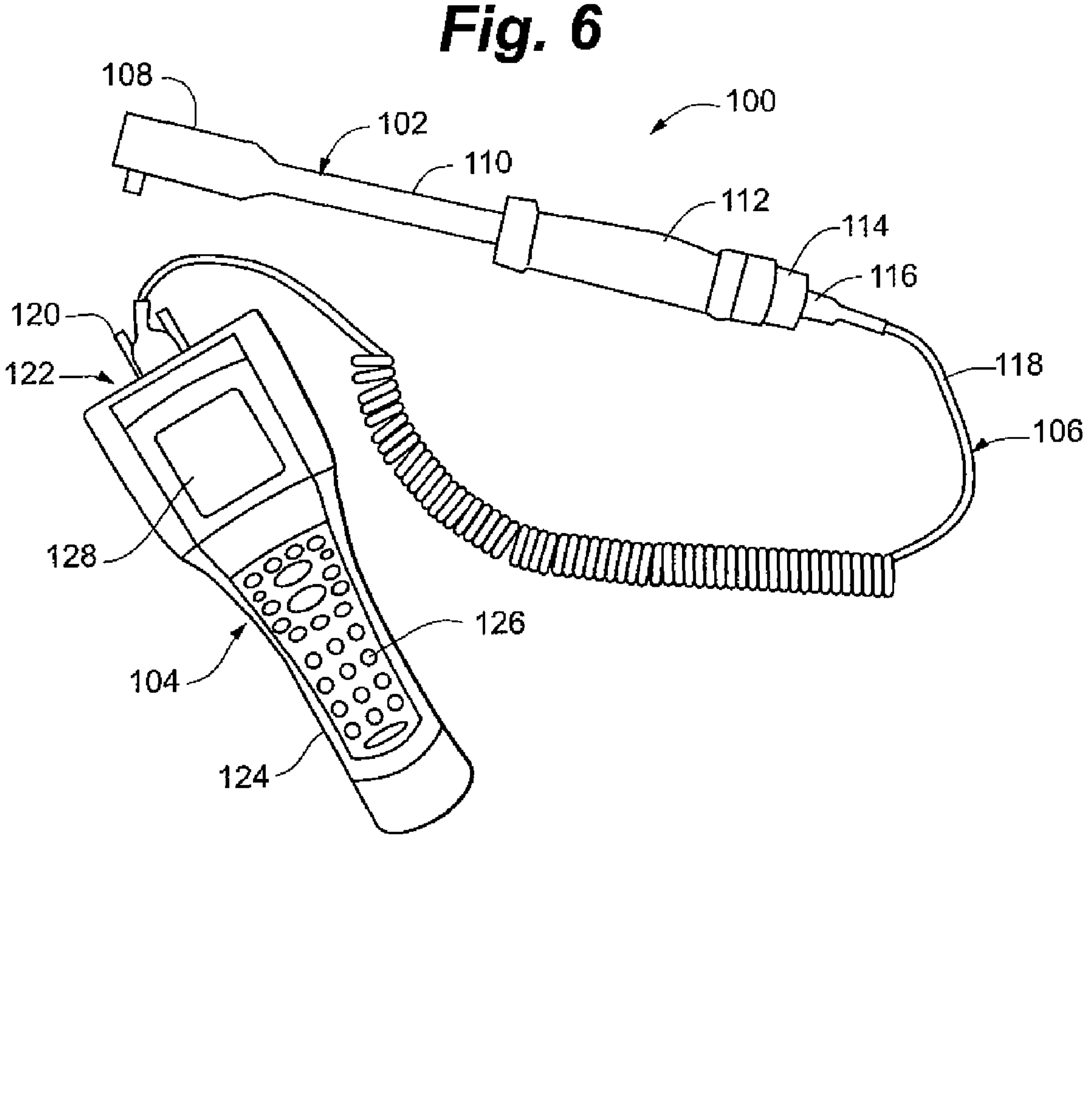
FIG. 6 is an elevation view of a residual torque analyzer according to an embodiment of the present invention.

Referring to FIG. 6, in one embodiment, the present invention is a torque analyzer 100 that includes torque-angle wrench 102, data collector-analyzer (DCA) 104, and communication cable 106. Although depicted as separate components, it will be appreciated that in some embodiments, torque-angle wrench 102 and DCA 104 may be integrated to form torque analyzer 100, thereby eliminating the need for communication cable 106.

Figure 7:
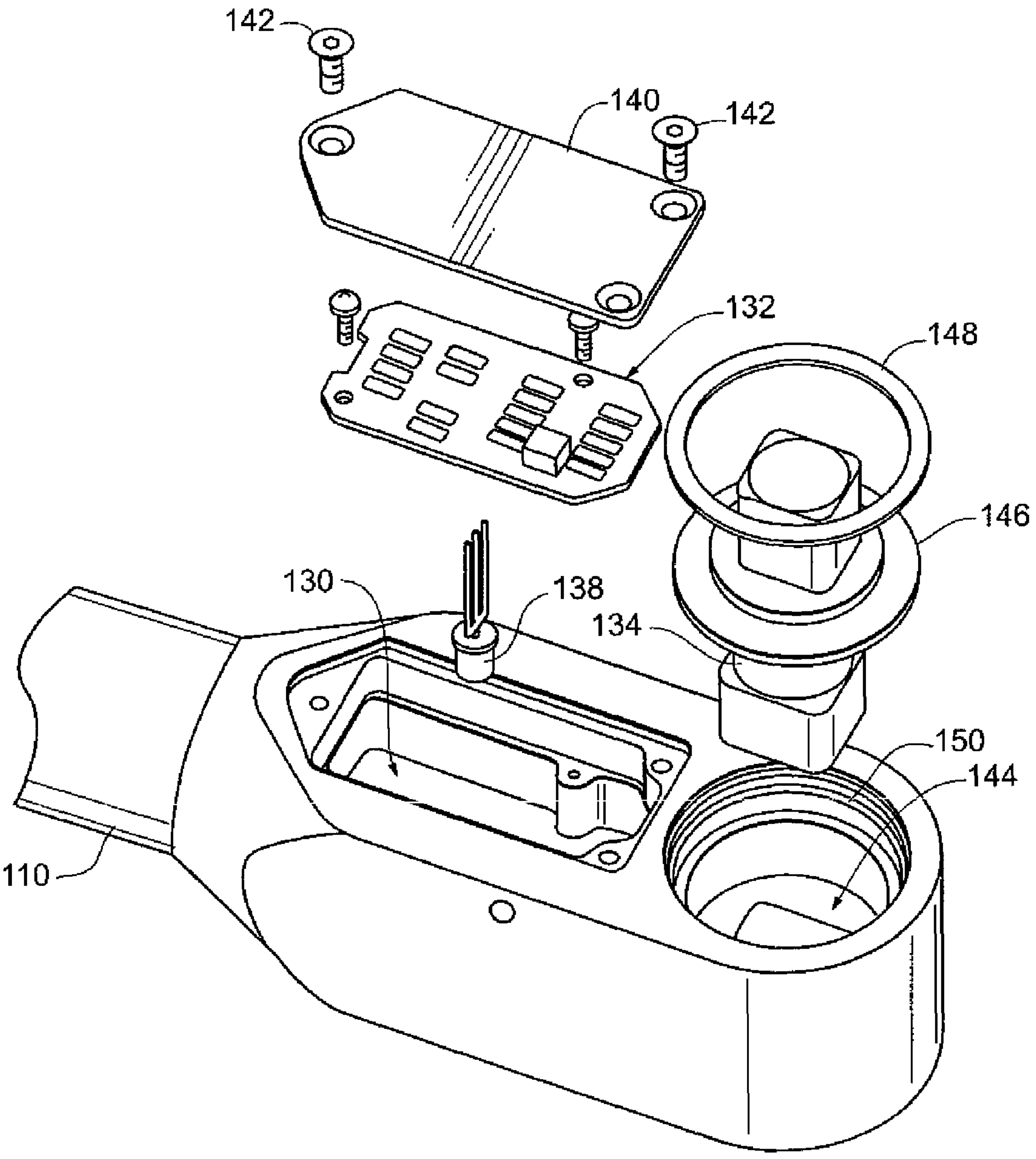
FIG. 7 is a perspective view of a head assembly of a torque-angle wrench of the residual torque analyzer of FIG. 6.
Figure 8:
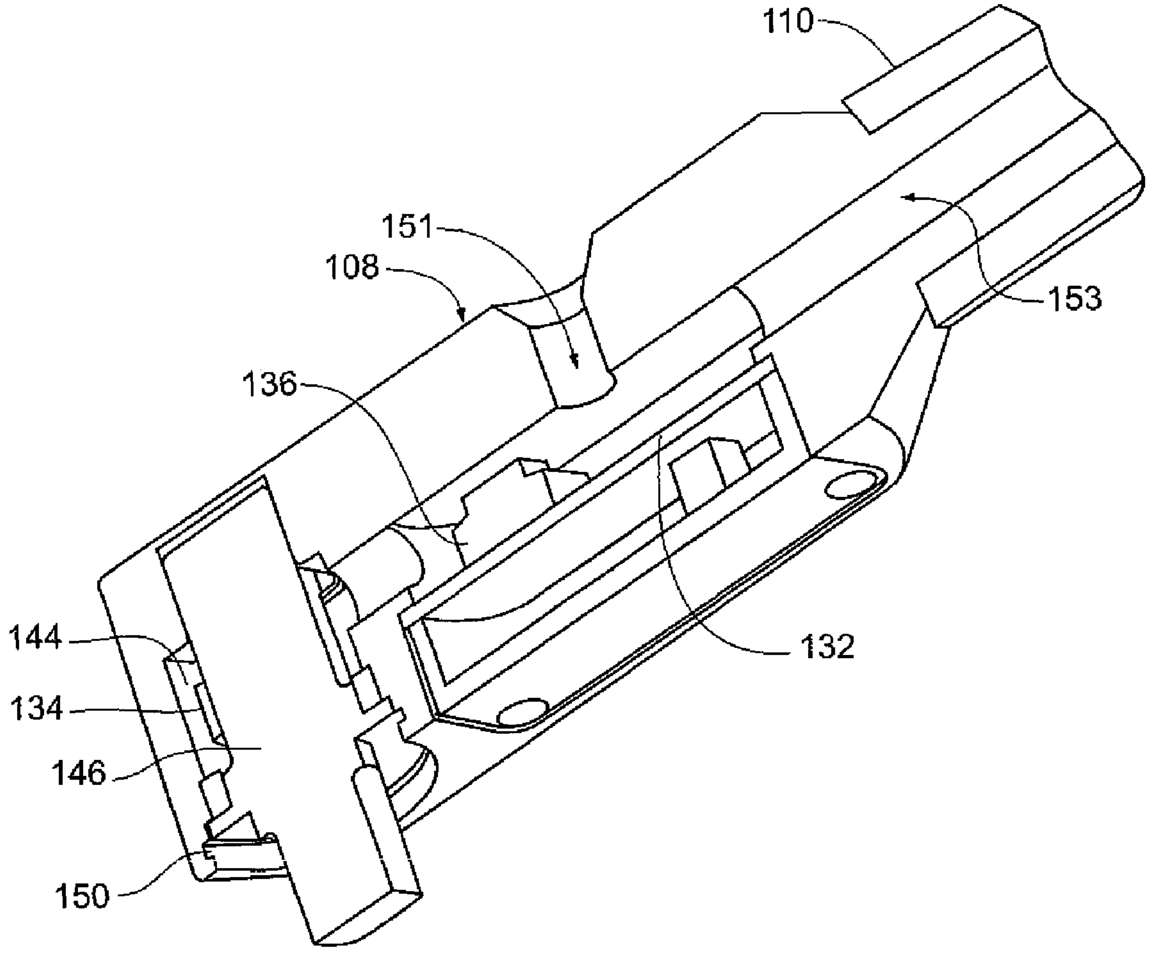
FIG. 8 is a cross-sectional view of the head assembly of FIG. 7.

Referring to FIGS. 6-8, torque-angle wrench 102 includes head assembly 108, shaft 110, handle 112, and connector 114. In one embodiment, head assembly 108 includes circuit board assembly 132, cover plate 140, screws 142, torque transducer 134, and socket retainer 146. Head assembly 108 defines an electronics cavity 130 that houses circuit board assembly 132. As will be discussed in further detail below, circuit board assembly 132 includes gyroscope 136 and indicating LED 138. Cover plate 140 covers an opening of cavity 130 to enclose circuit board assembly 132 in cavity 130. Cover plate 140 may be held in place with screws 142, or by alternate fasteners, or other means, including gluing, function fit, or otherwise.

Head assembly 108 also defines socket retainer cavity 144 which houses socket retainer 146. Socket retainer 146 fits into socket retainer cavity 144 and in one embodiment is retained in cavity 144 via retaining ring 148, which may snap or thread into groove 150 of head assembly 108. Socket retainer 146 may include a ball detent and spring, or other detent arrangement, for holding, or retaining, a socket or other device used to turn a fastener, to head 108. It will be appreciated that other embodiments may include a socket retainer with an integrated socket, rather than an interchangeable socket, or various other devices for fitting head 108 to a fastener.

Torque transducer 134 is mechanically coupled to socket retainer 146 to detect torque applied to a fastener. In one embodiment, torque transducer 134 is mounted to an outer surface of a shaft of socket retainer 146, and located within cavity 144.

In one embodiment, head assembly 108 also defines an LED receiving channel 151. The electrical leads of indicating LED 138 in some embodiments may be attached to circuit board 132, with the illuminating portion of LED 138 inserted into channel 151 and visible to an operator or user of torque analyzer 100 during use.

Referring specifically to FIG. 6, shaft 110 connects head 108 to handle 112, and includes wiring channel 153. Shaft 110 may be an integral part of head 108 and handle 112, or in other embodiments may be a separate component. Similarly, handle 112 may be a replaceable, separate component, or may be integral to shaft 110.

Figure 9:
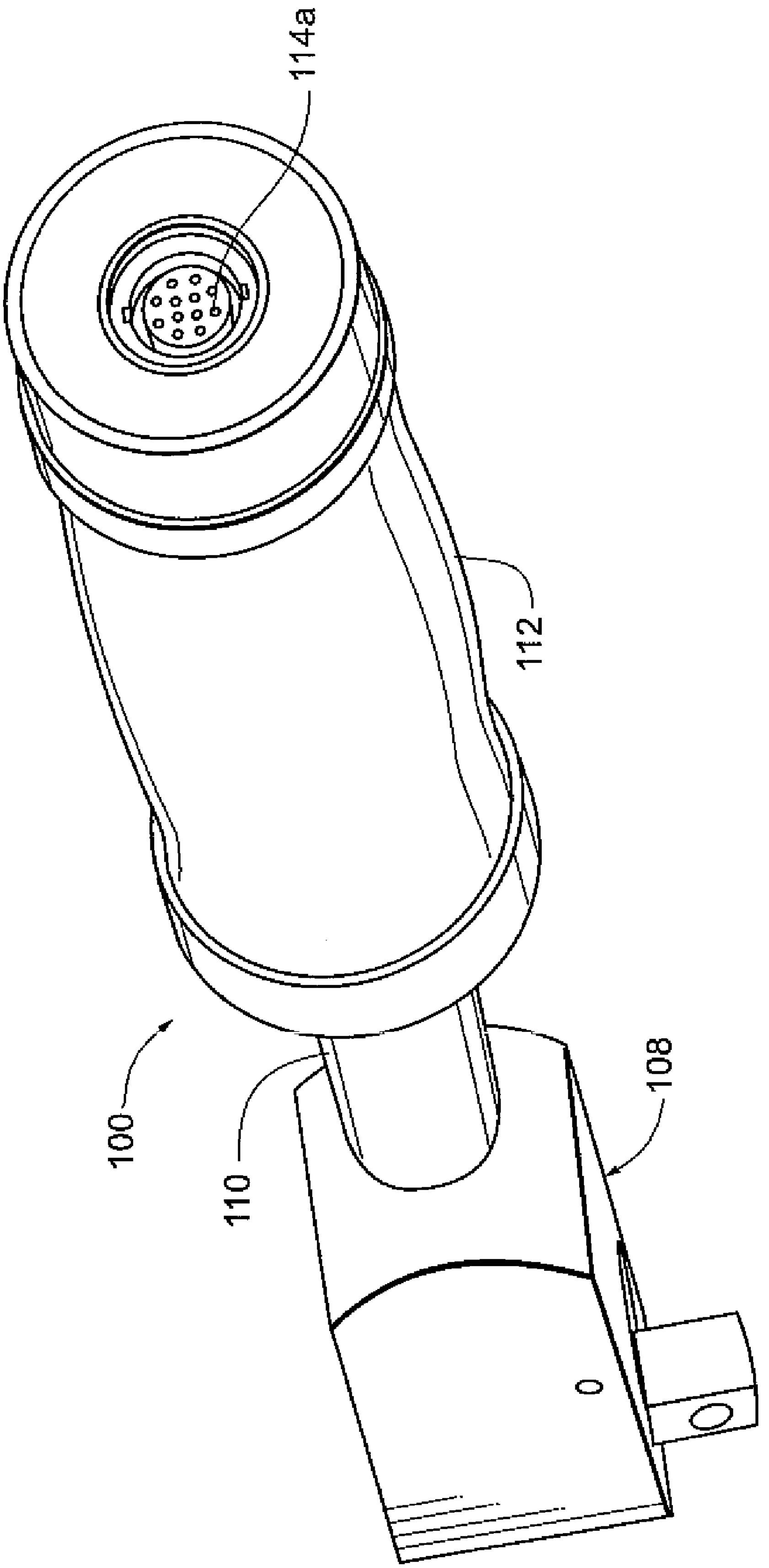
FIG. 9 is a perspective view of a torque analyzer with an analog connector assembly, according to an embodiment of the present invention.
Figure 10:
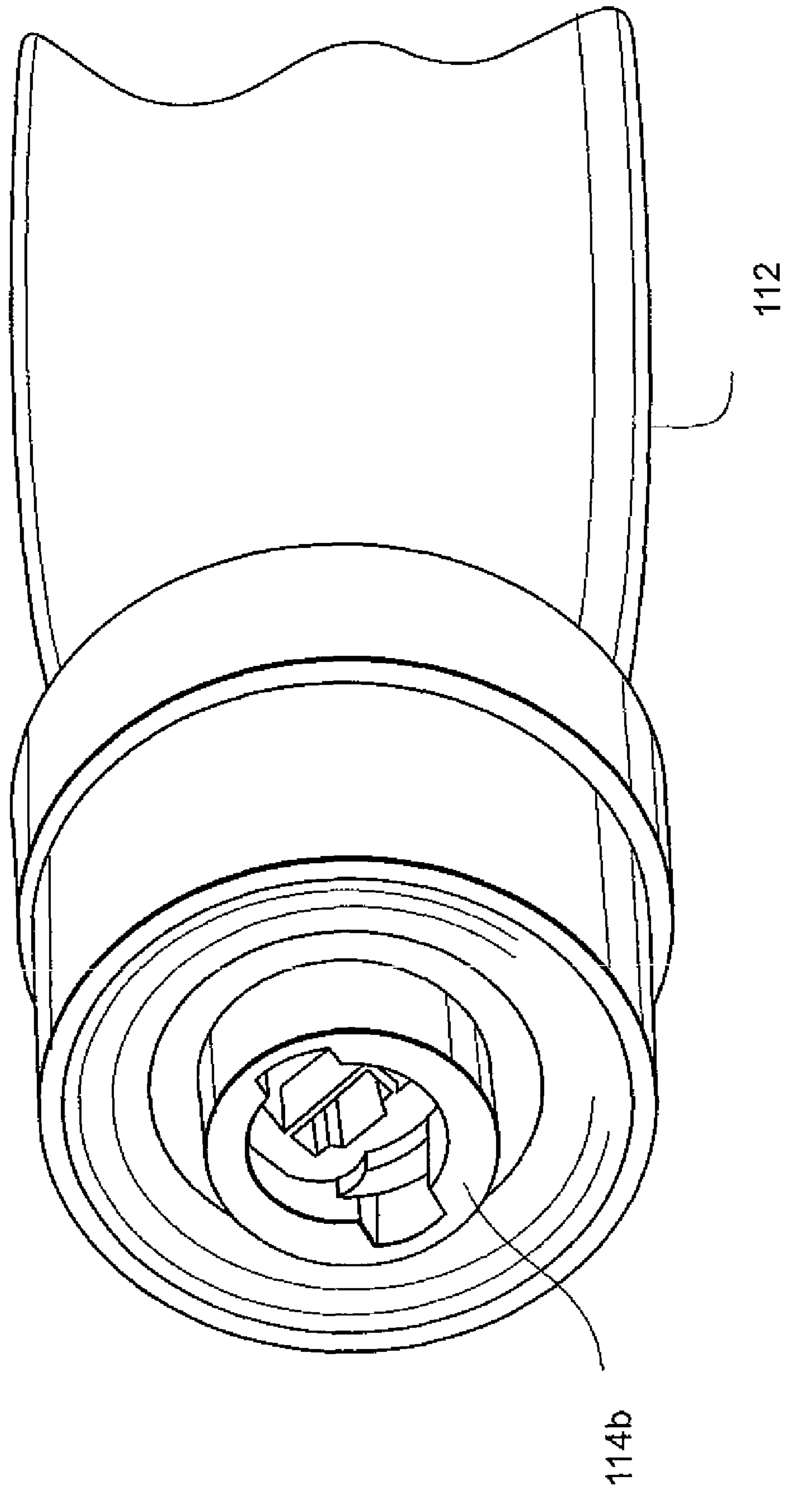
FIG. 10 is a perspective view of a torque analyzer with a digital connector assembly, according to an embodiment of the present invention.

Connector assembly 114, in one embodiment of the present invention, is located at an end of handle 112 distal to head 108, and is adapted to receive communication cable 106. Electrical wires of cable 106 extend into handle 112 and shaft 110, through wiring channel 153 for connection to circuit board 132. In one embodiment, connector assembly 114 is adapted to facilitate communication of analog signals as depicted by connector assembly 114*a*, for example, in FIG. 9. In other embodiments, connector assembly 114 may be adapted to facilitate communication of digital signals as depicted by connector assembly 114*b* in FIG. 10.

In other embodiments, torque analyzer 100 may be of a wireless configuration such that connector assembly 114 and cable 106 become unnecessary, and may be replaced with an appropriate transceiver located at handle 112, head 108, or elsewhere in, or upon, torque analyzer 100.

Figure 11:
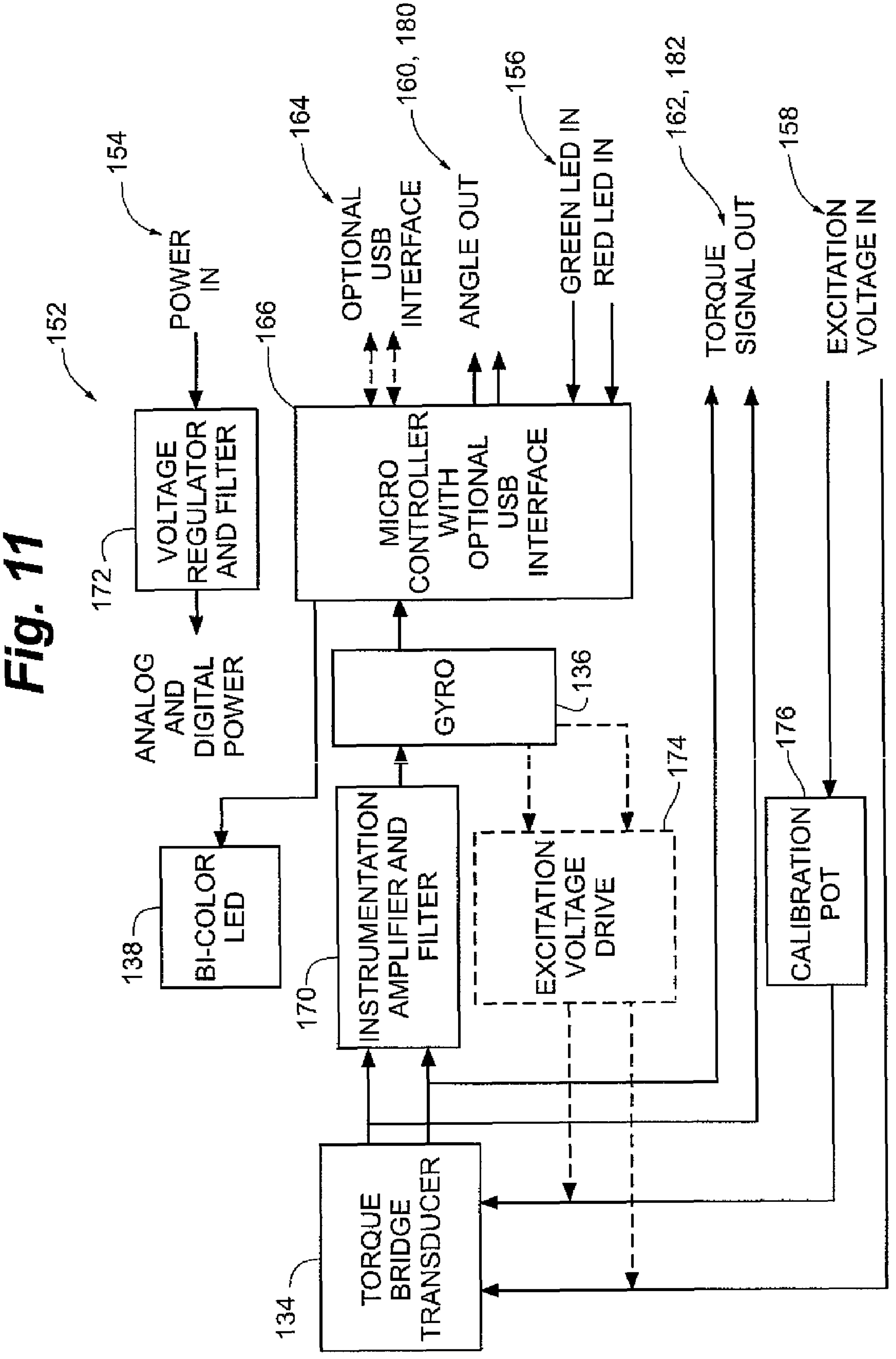
FIG. 11 is a block diagram of the residual torque and angle sensing system of the torque angle wrench of FIG. 6.

Referring to FIG. 11, a block diagram of torque and angle sensing system 152 of torque analyzer 100 is depicted. In one embodiment system 152 includes a number of electronic interfaces, and electronic components assembled on circuit board assembly 132 and located within torque angle wrench 102, as discussed above and depicted in FIGS. 7-8.

Torque and angle sensing system 152 interfaces may include power-in interface 154, LED-input interface 156, excitation-voltage interface 158, angle-out interface 160, and torque signal-out interface 162. Alternatively, power-in, LED-input, angle-out, and torque signal-out interfaces may be combined into a single USB interface 164, or other known standard interface. In one embodiment, sensing system 152 includes excitation voltage interface 158. In such an embodiment, a digital connector such as connector 114*b* may be used to interface torque angle wrench to DCA 104.

Torque and angle sensing system 152 also includes a number of components in electrical communication with each other, including: computing unit 166, gyroscope 136, instrumentation amplifier and filter 170, voltage regulator and filter 172, LED 138, and torque transducer 134. As discussed further below, in one embodiment, sensing system 152 also includes an on-board excitation voltage drive 174. In an alternate embodiment, system 152 receives an excitation voltage from DCA 104, or another external source, and therefore includes excitation voltage interface 158 and a calibration pot 176, rather than excitation voltage drive 174.

Computing unit 166 receives an angle output signal from gyroscope 136, and in one embodiment may be a microcontroller containing flash memory for program storage, EEPROM for nonvolatile data storage, and RAM. In some embodiments, computing unit 166 may include USB interface 164, such that flash memory program storage can be programmed using USB interface 164 and an on-board bootloader. Computing unit 166 may be one of many commercially available microcontrollers, including microcontroller AT90USB1286 AVR, with a 12 Mb/s USB interface operating at 16 MHz, available from Atmel Corporation of San Jose, Calif. In other embodiments, computing unit 166 may include a separate microprocessor, memory and peripherals.

Gyroscope 136 contains an on-board integrator so it can directly output an angle of rotation measurement 180, as well as an auxiliary analog-to-digital converter (ADC) and reference that is used for measuring a torque applied to torque transducer 134. Gyroscope 136 may be one of many commercially available, high-resolution gyroscopes such as the ADIS16255 gyroscope available from Analog Devices, Inc. of Norwood, Mass.

In one embodiment, two comparators are also implemented in gyroscope 136 for the purpose of generating alarms. The two alarms are configured to monitor the auxiliary ADC to detect when torque is applied to torque angle wrench 102 in either the clockwise or counterclockwise direction. The gyroscope will be configured to route the alarm signal to a general purpose output pin of gyroscope 136. An alarm signal is connected to an interrupt pin on computing unit 166. With no torque applied to wrench 102, wrench 102 can go into a lower power state to conserve energy. When sufficient torque is applied to wrench 102, the alarm output of gyroscope 136 will trip and generate an interrupt to "wake up" torque analyzer 100.

Gyroscope 136 may also include a second, general purpose input/output pin that will be configured to generate a data-ready interrupt signal to computing unit 166. When the torque input is greater than the alarm threshold, the data ready output of gyroscope 136 will generate an interrupt when a new data sample is ready for processing.

Instrumentation amplifier and filter 170 provides amplification for the low-level analog signal output from torque bridge transducer 134. Filtering is also provided to remove signals that are out of a bandwidth of interest. In one embodiment, filtering is configured for less than 0.1% error from 0 Hz to 100 Hz. Instrumentation amplifier and filter 170 may be one of many commercially available amplifiers, including a Texas Instruments® INA 326 available from Texas Instruments Incorporated of Dallas, Tex.

LED 138 may be a bi-color LED driven by computing unit 166, and used to indicate if a torque reading is out of specification, within specification, or within specification, but outside of caution limits. LED 138 may be controlled through LED input interface 156 or through USB interface 164. However, because computing unit 166 ultimately controls LED 138, it may be used for other purposes such as indicating wrench 102 status during a power-on self test, or if a failure occurs.

Torque transducer 134 in one embodiment is a strain gage transducer that measures torque applied by wrench 102 to a fastener. The output of transducer 134 output may be scaled as needed. Torque transducer 134 may be one of many commercially available strain gage transducers or other torque transducers.

If torque and angle sensing system 152 receives an excitation voltage input from an external source, such as DCA 104, via excitation voltage in interface 158, system 152 includes calibration potentiometer 176. Calibration potentiometer 176 is used to adjust or scale the output of torque transducer 134 to an appropriate level.

In some embodiments, system 152 does not rely on an external excitation voltage source, and instead utilizes excitation voltage drive 174. Excitation voltage drive 174 buffers the ADC reference voltage of gyroscope 136 so that torque transducer 134 may be driven at this voltage level.

Finally, voltage regulator and filter 172 is used to regulate and filter the input power supplied by DCA 104 for use by the other electrical components of system 152, as discussed above.

With respect to the input interfaces of sensing system 152, power-in interface 156 enables power to be supplied from DCA 104 to torque angle wrench 102. LED-input interface 156 allows DCA 104 to control one or more LEDs 138. In some embodiments, LED-in interface 156 may accommodate a bi-color, or multicolor LED 138, such as a red-green LED 128. Excitation voltage in interface 158 transfers an excitation voltage to system 152, as discussed further below.

Referring still to FIG. 11, angle-out interface 160 facilitates output of an angle out signal 180. In one embodiment, angle out interface 160 is a quadrature interface used to output angle signal 180 in the form of a quadrature output signal that emulates the output of a rotary encoder. In its quadrature form, interface 160 provides a Phase A and a Phase B signal. When Phase A leads Phase B, torque angle wrench 102 is rotating in a clockwise direction. When Phase B is leading Phase A, torque angle wrench 102 is rotating in a counterclockwise direction. Accordingly, in one embodiment, angle out interface 160 will output 9828 counts per revolution, which in one embodiment, corresponds to the native resolution of gyroscope 136 angle output. Other embodiments may utilize higher or lower resolution.

Further, torque signal out interface 162 facilitates transfer of torque signal 182. In the embodiment where torque transducer 134 is a strain gauge, torque signal 182 is a low-level differential analog output signal. The magnitude of torque signal 182 corresponds to the amount of torque applied to the wrench. Further, the polarity of torque signal 182 is dependent on the direction of torque applied to wrench 102. In one embodiment, the full scale torque signal output 182 voltage will be 2 mV/V excitation.

In basic operation, torque-angle wrench 102 receives a power signal via interface 154, thereby providing power to the other electrical components of torque and angle sensing system 152. System 152, in one embodiment as described above, also receives an excitation voltage via excitation voltage interface 158, providing the necessary drive voltage to torque transducer 134. In an alternative embodiment, excitation voltage drive 174 of system 152 provides the necessary drive voltage to torque transducer 134.

Torque-angle wrench 102 is coupled to a fastener of a joint under test, or previously tightened fastener, and torque is applied to the fastener. As torque is applied to the fastener, torque transducer 134 delivers a torque signal 182 to instrumentation amplifier and filter 170. Instrumentation amplifier and filter 170 amplifies and filters torque signal 182 before delivery to gyroscope 136. Torque signal 180 of torque transducer 134 is also available prior to amplification and filtering, at interface 162, for delivery to DCA 104.

DCA 104 may power LED 138 through LED interface 156 and computing unit 166 at various stages of the measurement process, to communicate status information to a user. For example, LED 138 may emit red light when torque-angle wrench 102 is initially rotated, then may emit green light when fastener motion is detected.

Gyroscope 136 senses the angular motion of torque-angle wrench 102 and delivers an angle signal 182 to computing unit 166, for delivery to angle out interface 160 and DCA 104.

Figure 12:
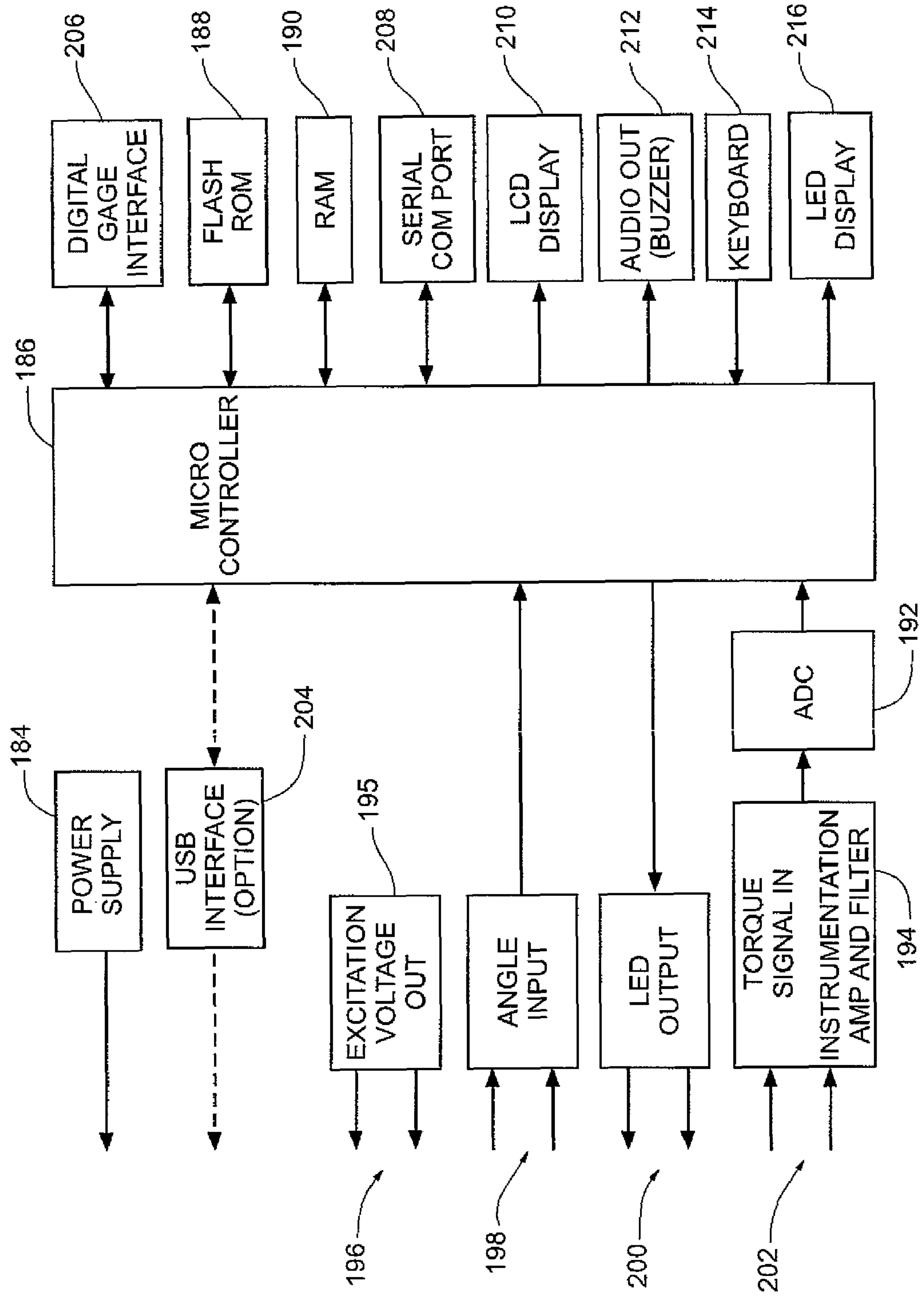
FIG. 12 is a block diagram of a data collector-analyzer according to an embodiment of the present invention.

Referring to FIG. 12, a block diagram of DCA 104 is depicted. In one embodiment, DCA 104 includes a power supply 184, microcontroller 186, flash ROM 188, RAM 190, analog-to-digital converter 192, instrumentation amplifier and filter 194, excitation voltage drive 195, and a number of interfaces to torque-angle wrench 102, including excitation voltage out interface 196, angle input interface 198, LED output 200, and torque signal in interface 202. In an alternate embodiment, DCA 104 may interface with torque-angle wrench 102 via an optional USB interface 204. In some embodiments, DCA 104 may also include: digital gage interface 206 to enable DCA 104 use with an external digital gage; serial communications port 208 for data exchange; LCD display 210 for display of torque-angle curves and other relevant data; audio-out interface or buzzer 212 to alert a user of various activities; keyboard 214 for entry of information by a user; and LED display 216, in communication with microcontroller 186.

Power supply 184 may comprise DC batteries, an AC/DC converter, or other appropriate source of power.

Microcontroller 186 may be a microcontroller, such as one of the microcontrollers described above, or may comprise a separate microprocessor with external memory, or another computing unit adapted to process data as needed by DCA 104. Microcontroller 186 may also include firmware for analyzing measured torque-angle data, and for controlling and communicating with torque-angle wrench 102.

Flash ROM 188 may be used to store and/or update analytical software and algorithms used for analyzing measured torque-angle data, and for controlling and communicating with torque-angle wrench 102.

Figure 13:
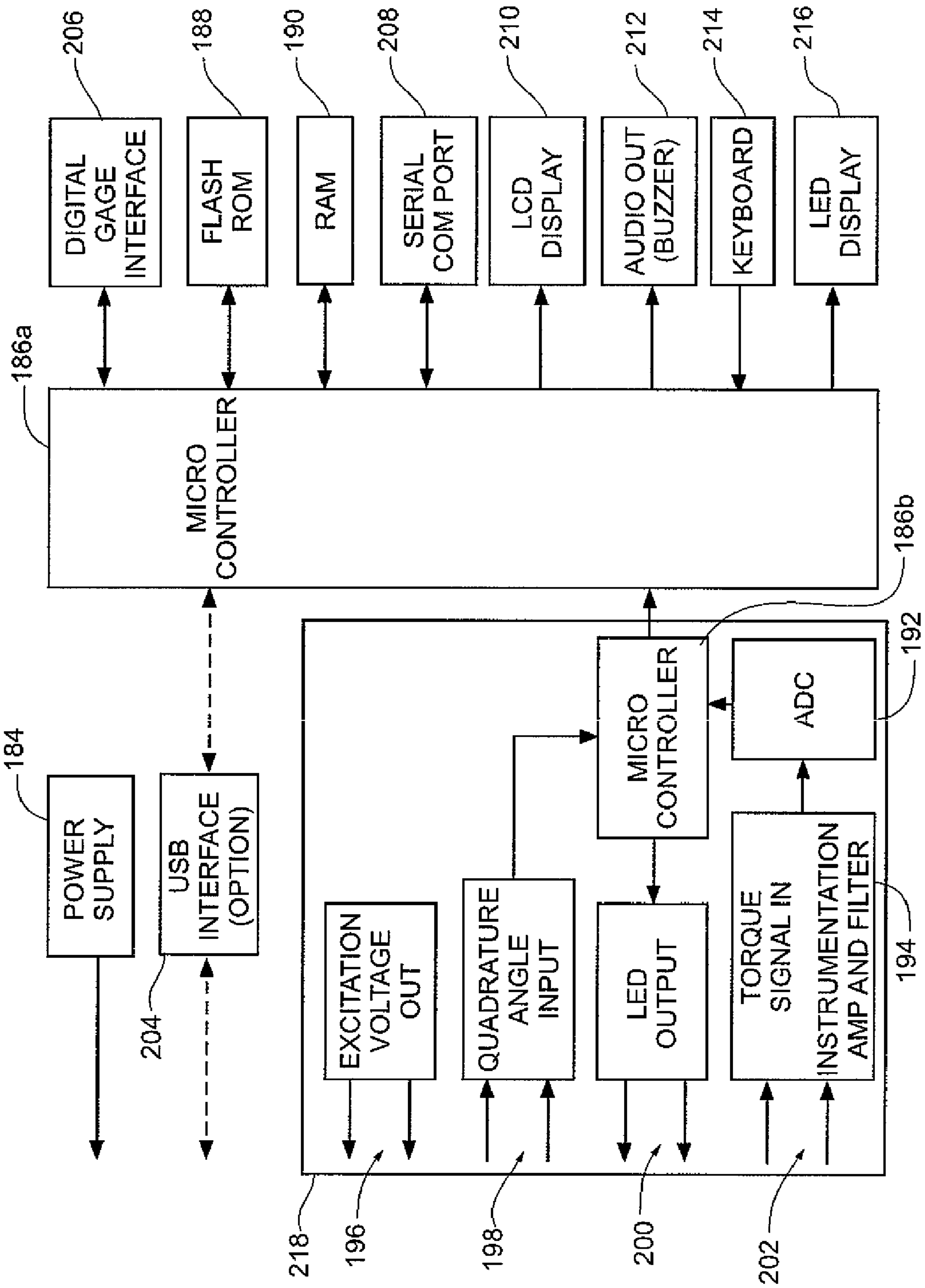
FIG. 13 is a block diagram of a data collector-analyzer according to another embodiment of the present invention.

Referring to FIG. 13, in another embodiment, DCA 104 may include a second microcontroller, microcontroller **186*b*, and have a number of components assembled together in an interchangeable DCA module 218. In such an embodiment, DCA module 218 includes microcontroller 186*b*, ADC 192, instrumentation amplifier and filter 194, and interfaces 196 to 202. In this embodiment, microcontroller 186*b* may be adapted to condition and digitize the inputs from torque-angle wrench 102 for delivery to primary microcontroller 186*a*. Further, DCA module 218 may be removed from DCA 104** to facilitate the upgrading of hardware and software.

In basic operation, power supply 184 provides power to DCA 104, and in turn to torque-angle wrench 102. Excitation voltage drive 195 provides an excitation voltage via interface 196 to torque-angle wrench 102 for use in driving torque transducer 134. Alternatively, and as described above, torque-angle wrench 102 may include excitation voltage drive 174. In such an alternative embodiment, DCA 104 may not include excitation voltage drive 195.

A user may interact with DCA 104 via keyboard 214 to select various measurement and analytical options. Such options may include detection of a breakaway point versus restart point, audio alert options, display options, and so on.

After torque-angle wrench 102 couples with the fastener, and the user or operator begins to rotate torque-angle wrench 102, angle signal 180 is received at angle input interface 198 and torque signal 182 is received at interface 202. Torque signal 182 is amplified, filtered, and converted from an analog to a digital signal by ADC 192. Torque and angle data may then be saved and/or analyzed by microcontroller 186, and displayed to a user at LCD display 210. Analysis of detected torque and angle data may be accomplished by microcontroller 186, but alternatively may be analyzed by an external processor in communication with torque analyzer system 100.

To communicate with an external processor or memory device, whether for analysis or storage of torque and angle data, DCA 104 includes in one embodiment communication port 208. As depicted, communication port 208 is a serial communication port, but in other embodiments may comprise a parallel port, or any of a variety of known ports and associated techniques used to facilitate the transfer of data.

Figure 14:
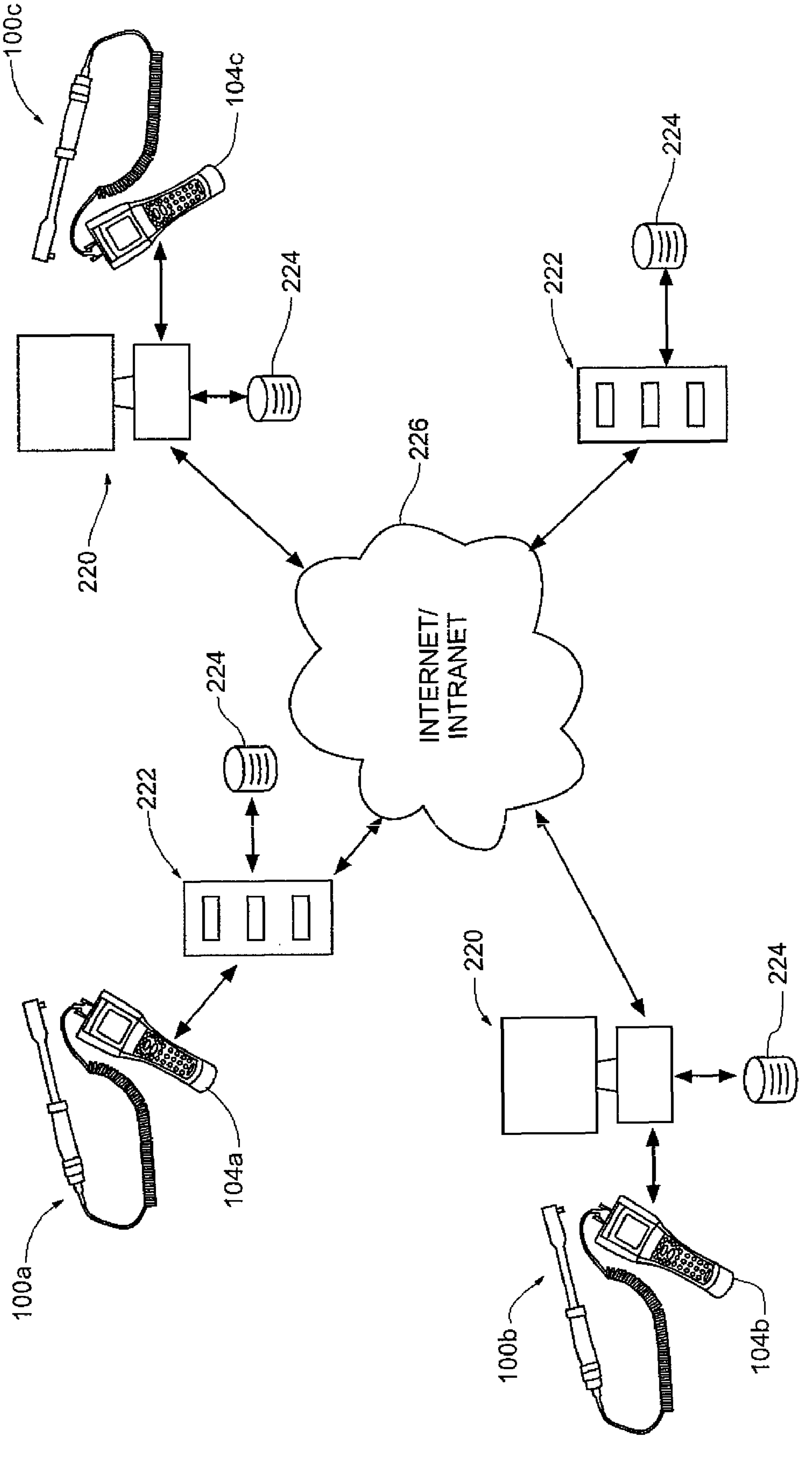
FIG. 14 is a network diagram of several torque analyzers in communication over a computer network, according to an embodiment of the present invention.

Referring to FIG. 14, to facilitate transfer and analysis of torque and angle data, DCA 104 may be part of local-area network (LAN), wide-area network (WAN), or both. The network of FIG. 14 depicts three torque analyzers **100*a*, 100*b*, and 100*c* in communication with client computers 220, servers 222, and databases 224, via Internet or Intranet 226**.

DCAs 104 of torque analyzers 100 may be adapted to communicate with either clients 220 or servers 222 in order to transfer torque and angle data to the various databases 224 of the network. Such data transfer allows for storage of data in databases in 224, and for external analysis and display of collected torque and angle data.

Figure 15:
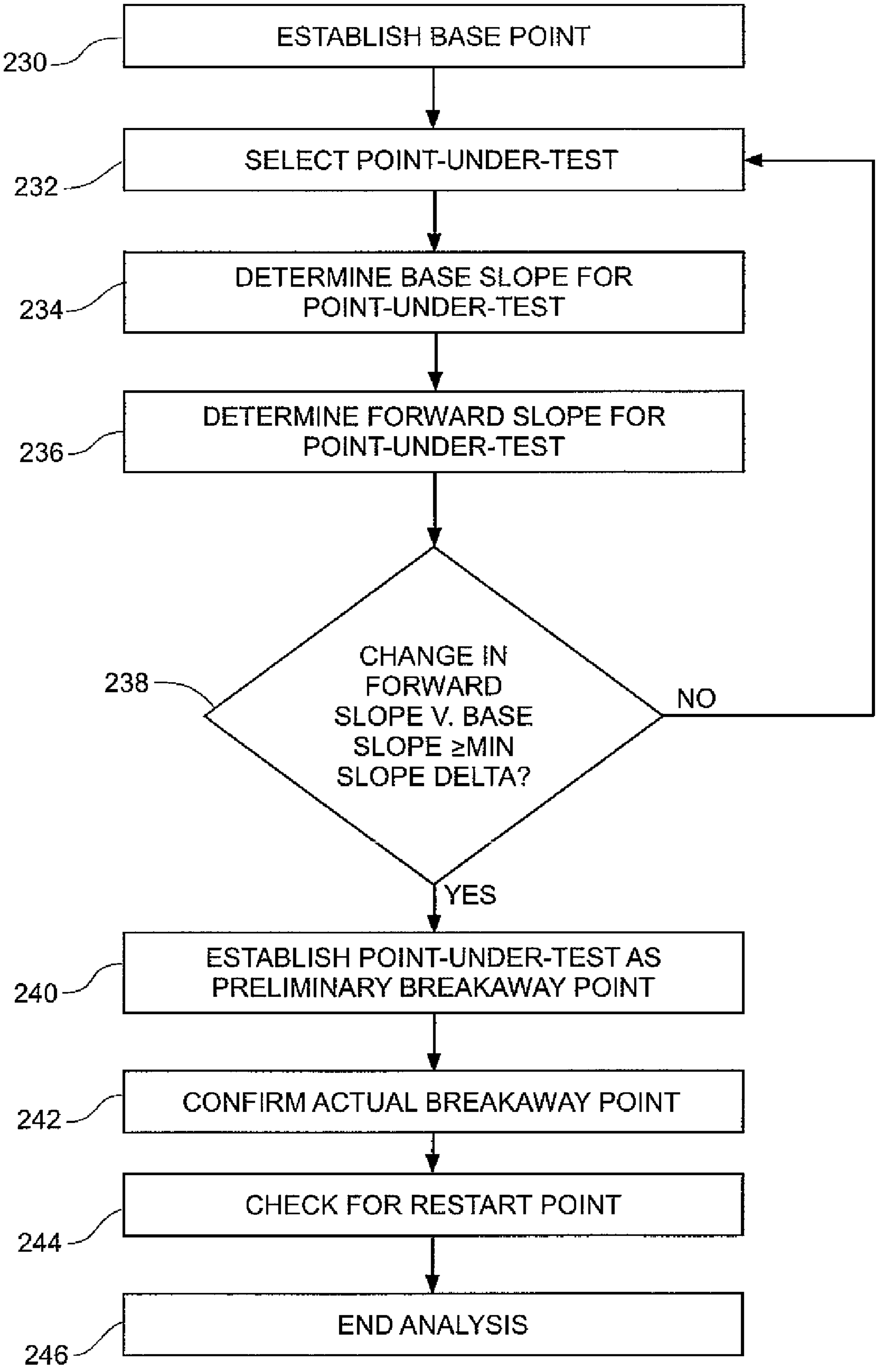
FIG. 15 is a flowchart of a method of determining a residual torque in a fastener, according to an embodiment of the present invention.

Referring to FIG. 15, and regardless of whether analysis occurs via DCA 104 or an external processor, after obtaining torque and angle measurement data, a residual torque value corresponding to either a breakaway torque value and/or a restart torque value may be determined according to steps 230 to 246.

Summarily, a collection of torque-angle data points above a torque threshold are analyzed to define a torque-angle curve. The torque-angle curve represents the force applied over the angular motion of the fastener. Each data point in the torque-angle curve is evaluated to determine whether it preliminarily represents a breakaway point. After a breakaway point is confirmed, a restart point is sought. If a restart point is determined, the corresponding torque value is identified as the residual torque on the fastener on test. If no restart point is determined, the torque value corresponding to the breakaway point best represents the residual torque on the fastener at test.

Figure 16:
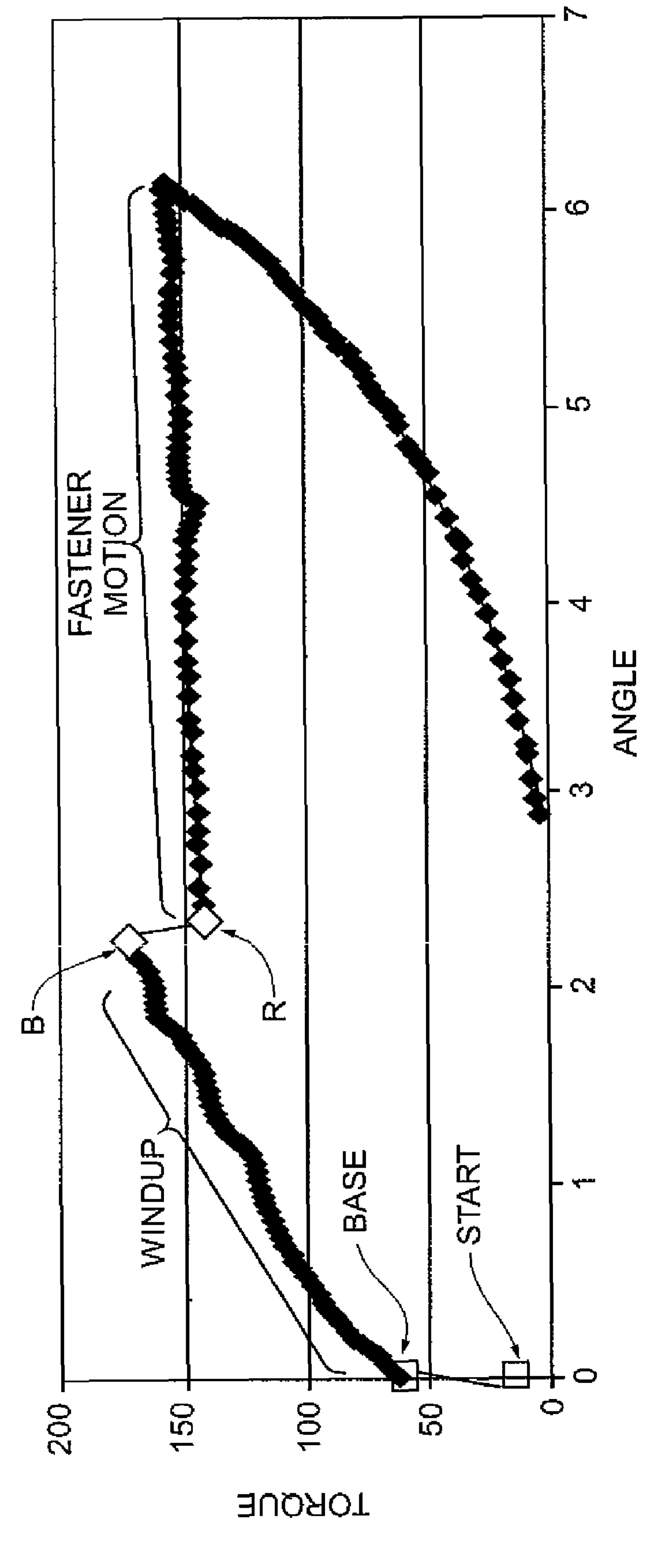
FIG. 16 is an exemplary torque-angle curve depicting windup and fastener motion.

Referring to FIG. 16, breakaway torque may be defined as the torque necessary to overcome static friction in the previously tightened fastener or joint. A breakaway point in the torque-angle curve therefore represents a torque value and a corresponding angle at the instant of fastener rotation. In the depicted curve of FIG. 16, torque analyzer 100 has applied torque to a previously-tightened fastener and measured a number of torque-angle data points, thereby making a torque-angle curve available to a user.

Point B of FIG. 16 illustrates a breakaway point where measured torque is 170 Nm at an angular rotation of 2 degrees. At point B, the applied torque overcomes static friction, and the fastener begins to rotate. At point R, the restart point, the fastener begins to tighten. In a well-lubricated, low-static-friction joint the restart point and the breakaway point may be one and the same. The joint that generated the curve of FIG. 16 possessed a high component of static friction as indicated by the relatively steep slope between the breakaway and restart points. Torque corresponding to the restart point typically provides the best measure of power tool performance and the best indication of clamp force.

Referring again to FIG. 15, after measuring torque and angle points above a predefined threshold torque value, the data may be analyzed to determine a breakaway torque and a restart torque. Each measured torque value corresponds to a measured angle to create data pairs. Such data pairs define a torque-angle curve that may or may not be visually displayed on DCA 104. For the sake of explanation, reference will be made to a torque-angle curve comprised of a collection of torque-angle data pairs, and its characteristics, regardless of whether such a torque-angle curve is visually presented.

In summary, each point in the torque-angle curve is evaluated as a potential breakaway point by looking at the rate of change in the torque value over the change in angle. At step 230, a first torque-angle data point, or "point-under-test," is compared to a first post-threshold torque-angle data point to establish a baseline "slope," or change in torque over change in angle. At step 232 a first torque-angle data point above a start threshold, and after sensed wrench movement, is established as a base point. A first torque-angle data point, or "point-under-test", is selected at step 232. Next, a change in torque over a change in angle, "base slope," is calculated at step 234, followed by a forward slope determination at step 236. If the difference between the base slope and the forward slope is greater than a predetermined minimum as determined at step 238, then the point-under-test is preliminarily considered a breakaway point at step 240. An actual breakaway point is confirmed at step 242, followed by restart point check at 244. At the end of the analysis, at step 246, a torque associated with either the breakaway or restart point is considered the residual torque of the fastener.

More specifically, and with respect to step 230, a start torque threshold is predetermined. Torque-angle data is not considered prior to measured torque exceeding the start-torque threshold. For example, when torque-angle wrench 102 is coupled to a fastener under test, incidental torque and movement may be detected, though not actually part of the testing process. By predetermining a start-torque threshold and foregoing measurements until measured torque exceeds the start-threshold, false readings are avoided. The start-torque threshold value may be set by default to some small value greater than zero, yet significantly less than the torque specification of the previously tightened fastener.

After coupling torque-angle wrench 102 to the fastener under test, increasing torque is applied to the fastener and fastener joint. As depicted in FIG. 16, as torque is initially applied, the fastener is not in motion, but wrench 102 along with the fastener joint and its fixture may begin to flex, or wind up. Wind up is the sensed angular motion due to the inherent metallic elasticity in the wrench, drive, extension, socket, fastener, and work piece, and occurs prior to fastener movement. When the torque applied exceeds the start-torque threshold, indicated by point START, and gyroscope 136 detects motion in wrench 102, a base point BASE is established, and subsequent torque-angle data points may be considered one-by-one as points-under-test.

Referring again to FIG. 15, at step 232, after determining a base point, a subsequent torque value is measured along with its corresponding angle. In one embodiment, each torque-angle data point following the base point, or "point-under-test" is sequentially evaluated as a possible breakaway point.

At step 234, a base slope for the point-under-test is determined. A base slope is determined by dividing the change in torque of the point-under-test to the base point by the change in angle of the point-under-test to the base point. Until a breakaway point is determined, the base slope is generally representative of joint wind up.

At step 236, a forward slope for the point-under-test is determined. The forward slope is defined as the change in torque over the change in angle, for the point-under-test as compared to a data point subsequent to the point-under-test, called the "forward point," which is located further along the torque-angle curve. The forward slope may also be defined as the slope of a straight line drawn between the point-under-test and a subsequent forward point.

Figure 17:
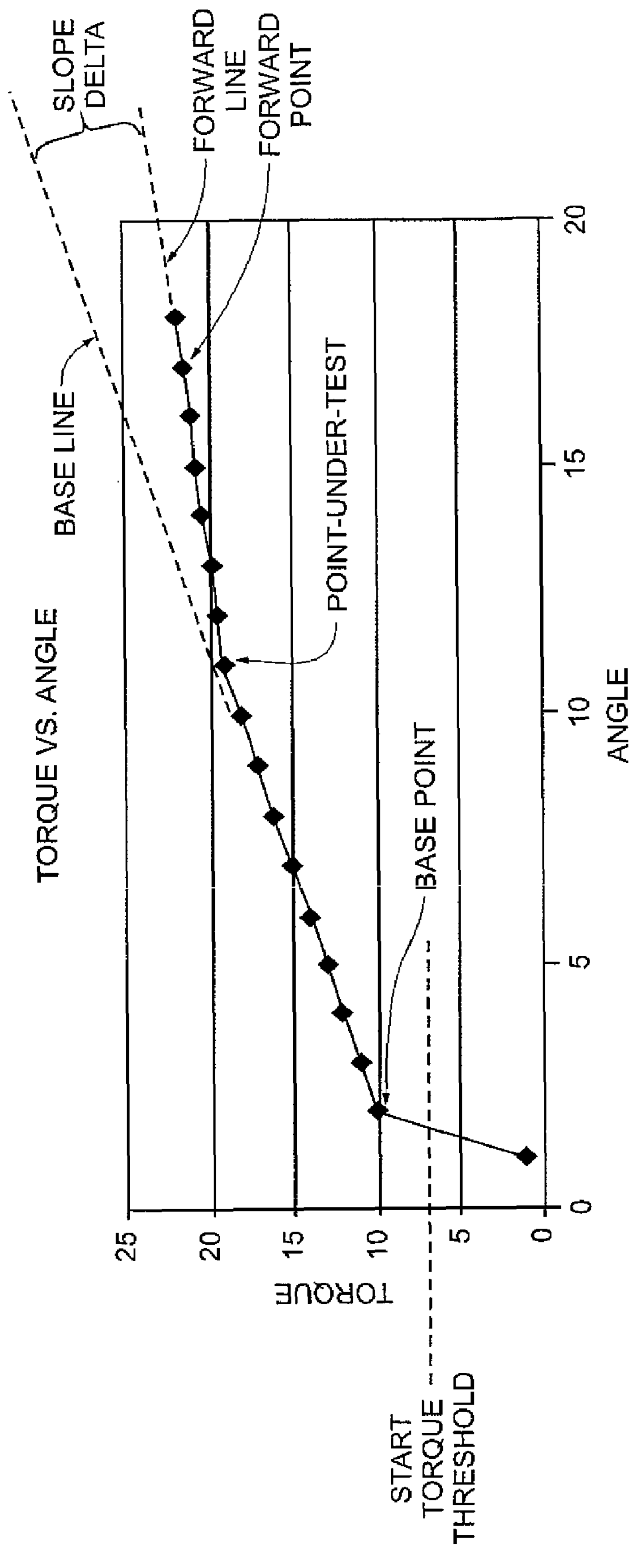
FIG. 17 is an exemplary torque-angle curve depicting a start torque threshold, base point, point-under-test, forward point, and slope delta.

Referring to Table 1, and to FIG. 17, an exemplary set of torque-angle data and corresponding torque-angle curve are depicted. In this example, the set of torque-angle data includes eighteen torque-angle data points.

TABLE 1

| Point | Angle (Deg.) | Torque (Nm) | Base Slope | Forward Slope | Slope Delta (%) |
|---|---|---|---|---|---|
| 1 | 1 | 1 | | | |
| 2 | 2 | 10 | | | |
| 3 | 3 | 11 | 1.00 | | |
| 4 | 4 | 12 | 1.00 | | |
| 5 | 5 | 13 | 1.00 | | |
| 6 | 6 | 14 | 1.00 | | |
| 7 | 7 | 15 | 1.00 | | |
| 8 | 8 | 16 | 1.00 | | |
| 9 | 9 | 17 | 1.00 | 1.00 | 0 |
| 10 | 10 | 18 | 1.00 | 1.00 | 0 |
| 11 | 11 | 19 | 1.00 | 1.00 | 0 |
| 12 | 12 | 19.4 | .94 | .90 | 10 |
| 13 | 13 | 19.8 | .89 | .80 | 20 |
| 14 | 14 | 20.2 | .85 | .70 | 30 |
| 15 | 15 | 20.6 | .81 | .60 | 40 |
| 16 | 16 | 21 | .78 | .50 | 50 |
| 17 | 17 | 21.4 | .76 | .40 | 60 |
| 18 | 18 | 21.8 | .73 | .40 | 57 |

The start torque threshold is chosen to be 7 Nm, such that point 1 is not used in the analysis, and point 2 becomes the base point having an angle A equal to 2 degrees and torque T equal to 10 Nm.

In this example, the point-under-test is point 11. In general, the base slope can be described per Equation 1. The base slope at point 11 is calculated per Equation 2.

$$\text{BASE SLOPE}=(\text{TORQUE}_{P\text{-}U\text{-}T}-\text{TORQUE}_{Base})/(\text{ANGLE}_{P\text{-}U\text{-}T}-\text{ANGLE}_{Base}) \quad \text{Equation 1}$$

$$\text{BASE SLOPE}_{point\ 11}=(19\text{ Nm}-10\text{ Nm})/(11\text{ degrees}-2\text{ degrees})=1.00 \quad \text{Equation 2}$$

The selected forward point in this example is point 17. The forward slope for the point-under-test, point 11, using a forward point of point 17 is calculated as 0.4 according to Equations 3 and 4:

$$\text{FORWARD SLOPE}=(\text{TORQUE}_{Forward}-\text{TORQUE}_{P\text{-}U\text{-}T})/(\text{ANGLE}_{Forward}-\text{ANGLE}_{P\text{-}U\text{-}T}) \quad \text{Equation 3}$$

$$\text{FORWARD SLOPE}_{Point\ 11\text{-}17}=(21.4\text{ Nm}-19.0\text{ Nm})/(17\text{ degrees}-11\text{ degrees})=0.4. \quad \text{Equation 4}$$

Similarly, when point 12 is the point-under test, the base point remains point 2, the forward point shifts to point 18, and a base slope and a forward slope are calculated to be 0.94 and 0.4, respectively.

With respect to the forward point, as described earlier, this point will be a point ahead, or further along the torque-angle curve. In one embodiment, during a point-by-point analysis, as was performed in the above example, the number of data points or the angular difference between the point-under-test and the forward point should be kept constant. Further, the number of data points or angular difference between the point-under-test and the forward point should be selected such that the forward point is sufficiently far enough away from the point-under-test to indicate a data trend. In the above analysis, and in an embodiment of the present invention, the forward point was chosen to be six data points, or 6 degrees ahead of each point-under-test. In other embodiments, anywhere from three to twelve data points may be used.

At step 238, a slope delta is defined as the percentage change in the base slope as compared to the forward slope. The slope delta is compared to a minimum slope delta.

As determined by Equations 4 and 6, the difference in the base slope and the forward slope, or slope delta, in the above example is therefore 0.6, or 60%:

SLOPE DELTA=(BASE SLOPE−FORWARD SLOPE)/BASE SLOPE   Equation 5

$$\text{SLOPE DELTA}_{Point\ 7}=(1.0-0.4)/1.0=0.6 \quad \text{Equation 6}$$

A relatively large change in slope as defined by the slope delta may be indicative of fastener movement, or breakaway. Referring to the previous example, point 6 defines a relatively small change in slope, 10%, while point 11 defines a relatively large change in slope, 60%.

A minimum slope delta is set such that a point with a slope delta that is greater than the minimum slope delta will preliminarily be considered a breakaway point. Selecting a minimum slope delta that is very small may result in the finding of many false breakaway points, while setting a slope delta too high may result in a missed breakaway point. In one embodiment, as exemplified above, a minimum slope delta of 60% provides an adequate balance. In other embodiments, the minimum slope delta may be larger or smaller, depending on desired sensitivity.

Still referring to step 238, if the slope delta falls below the minimum slope delta, the corresponding torque-angle data point is not considered a breakaway point, and another point-under-test is considered. In one embodiment, data points are tested sequentially, such that in the example above, each point 2 through 18 would be tested as a possible breakaway point.

If a slope delta of a point-under-test is equal to, or greater than the minimum slope delta, that point-under-test is preliminarily designated the breakaway point, and subject to further analysis at step 242.

A number of factors make it necessary to confirm whether the point-under-test, or a point in the vicinity of the point-under-test, is an actual breakaway point. These factors include fastener material, presence of washers, use of adhesives such as Loctite®, and other such factors. Additionally, some operators may pull torque-angle wrench 102 at different speeds or with more variation in speed, as compared to other operators. All of these factors may cause deviations in what would otherwise be a consistent torque-angle curve, thereby causing detection of a false, or early, breakaway point.

Therefore, to eliminate joint variability and operator inconsistency, and to avoid false breakaway points due to bumping, jerking or slipping of wrench 102, the preliminary breakaway point should be used to confirm an actual breakaway point at step 242.

Figure 18:
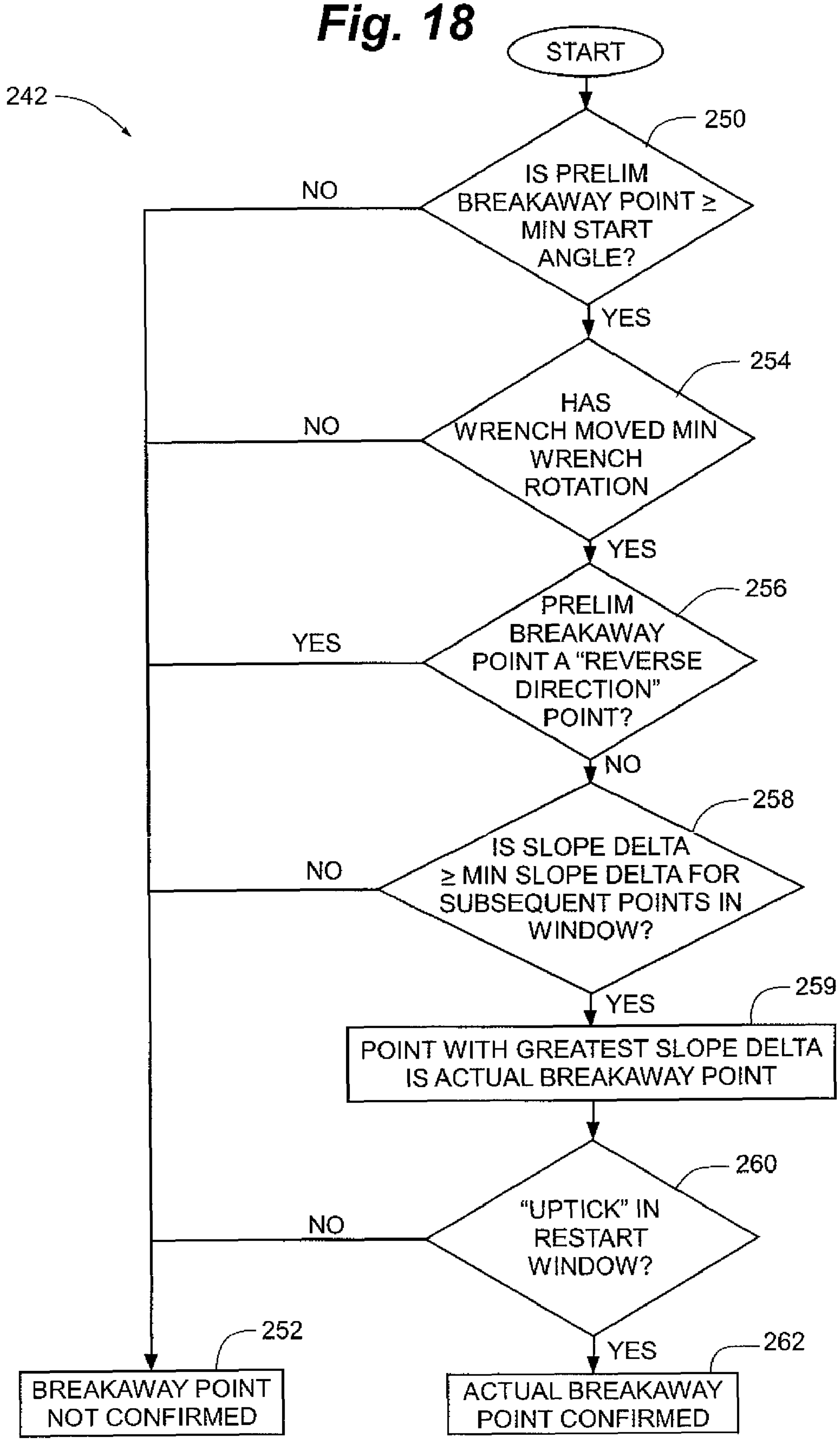
FIG. 18 is a flowchart of step 242 of FIG. 15, depicting confirmation of an actual breakaway point.

Referring to FIGS. 15 and 17, at step 242, the point-under-test preliminarily identified as a breakaway point, or preliminary breakaway point, is further analyzed in an effort to identify and confirm an actual breakaway point. Identification and confirmation of an actual breakaway point is accomplished at steps 250 to 262, as depicted in FIG. 18. Although presented sequentially, the particular order of the steps may vary from embodiment-to-embodiment, with some steps being performed even prior to the identification of a preliminary breakaway point, while in some embodiments, certain steps may be eliminated entirely.

Referring specifically to FIG. 18, at step 250, to prevent a false breakaway torque value from being detected when torque-angle wrench 102 is initially being set on, or coupled to, the fastener, a minimum amount of angular motion beyond the base point must first be verified. In one embodiment, the minimum amount of angular motion, or minimum start angle, may be 0.5 degrees. In other embodiments, the minimum start angle may be greater than or less than 0.5 degrees, depending on expected overall angular motion for the joint.

If a point-under-test is identified as a preliminary breakaway point, but the differential angular motion as compared to the base point is not greater than the minimum start angle, then the preliminary breakaway point is not confirmed, and the point-under-test is not identified as a breakaway point, as indicated at step 250.

For example, if a base point is identified as 10 Nm at 0.3 degrees, and a preliminary breakaway is identified at 15 Nm at 0.7 degrees, when the minimum start angle is 0.5 degrees, the preliminary breakaway point cannot be confirmed.

On the other hand, if the preliminary breakaway point meets the criteria of step 250, minimum wrench 102 movement is checked at step 254. To prevent false breakaway values from being observed when torque-angle wrench 102 is quickly jerked by an operator, preliminary breakaway points will be ignored if torque-angle wrench 102 does not rotate by a minimum amount, referred to as minimum wrench rotation. Minimum wrench rotation may be measured from the angle associated with the base point to the last, or one of the last, measured data points, and in one embodiment is 2 degrees.

If the minimum wrench rotation requirement is not met at step 254, the preliminary breakaway point cannot be confirmed.

Alternatively, if the minimum wrench rotation requirement is met at step 254, then at step 256, the preliminary breakaway point is analyzed to confirm that it is not a "reverse-direction" point. A reverse-direction point is defined as a torque-angle data point having an angle value that is less than the angle value of the immediately-prior torque-angle data point. Reverse-direction points may be measured when an operator pulls torque-angle wrench 102 in a slow and unsteady manner. Such an event is more likely to occur when an operator is tightening a fastener with a high-dynamic torque, such as a lug nut.

If a preliminary breakaway point is identified as a reverse-direction point, then the point-under-test cannot be confirmed as a breakaway point.

At step 258, the slope delta for the preliminary breakaway point and several subsequent, or following points, are analyzed. More specifically, at step 258, the slope deltas of multiple torque-angle data points following the preliminary breakaway point are compared to the minimum slope delta, and a breakaway point may be verified if multiple subsequent slope deltas exceed the minimum. The greater the number of subsequent points having slope deltas greater than the minimum slope delta, and the larger the differences, the higher the likelihood of an actual breakaway point.

In one embodiment of step 258, the point-under-test, or preliminary breakaway point, and a number of subsequent points following the preliminary breakaway point define a subsequent-point window. In one embodiment, the subsequent-point window comprises seven torque-angle data points. In other embodiments, the number of points in the window may be greater or fewer as needed. In this particular embodiment, each data point in the subsequent-point window must have a slope delta equal to, or greater than, the minimum slope delta, to meet the requirements of step 258. Further, the actual breakaway point is the data point within the subsequent-point window having the largest slope delta.

Figure 19:
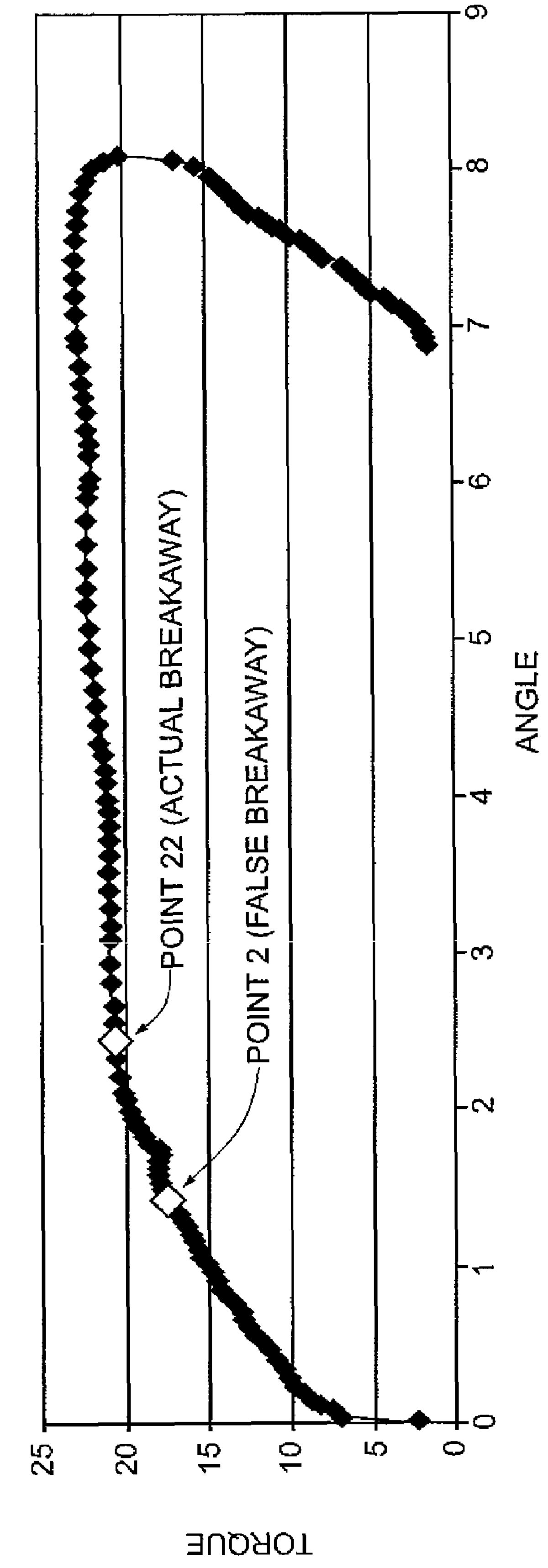
FIG. 19 is an exemplary torque-angle curve depicting a false breakaway and an actual breakaway point.

Referring to FIG. 19 and to Table 2 below, a series of torque-angle data points are presented in tabular and graphical form to illustrate the above-described embodiment of step 258.

TABLE 2

| Point | Torque (Nm) | Angle (deg) | Slope Delta (%) |
|---|---|---|---|
| 1 | 17.33 | 1.39 | 13 |
| 2 | 17.47 | 1.43 | 11 |
| 3 | 17.62 | 1.47 | 10 |
| 4 | 17.77 | 1.5 | 7 |
| 5 | 17.87 | 1.54 | 33 |
| 6 | 17.95 | 1.58 | 39 |
| 7 | 18.09 | 1.61 | 55 |
| 8 | 18.06 | 1.65 | 64 |
| 9 | 17.98 | 1.68 | 77 |
| 10 | 17.84 | 1.72 | 97 |
| 11 | 17.87 | 1.76 | 100 |
| 12 | 18.53 | 1.79 | 62 |
| 13 | 18.75 | 1.83 | 56 |
| 14 | 18.9 | 1.87 | 43 |
| 15 | 19.19 | 1.9 | 16 |
| 16 | 19.37 | 1.94 | -11 |
| 17 | 19.63 | 2.01 | -10 |
| 18 | 19.84 | 2.05 | 22 |
| 19 | 20.06 | 2.12 | 32 |
| 20 | 20.25 | 2.23 | 42 |
| 21 | 20.36 | 2.34 | 58 |
| 22 | 20.5 | 2.45 | 66 |
| 23 | 20.54 | 2.56 | 74 |
| 24 | 20.61 | 2.67 | 80 |
| 25 | 20.68 | 2.82 | 85 |
| 26 | 20.68 | 2.93 | 90 |
| 27 | 20.72 | 3.08 | 92 |
| 28 | 20.68 | 3.19 | 95 |
| 29 | 20.72 | 3.3 | 95 |

In this example, torque-angle data point 2, as depicted in FIG. 19 and Table 2, is first examined as a point-under-test. In one embodiment, the forward point corresponding to point 2 is point 8, yielding a slope delta of 64%. If the minimum slope delta is 60% as described in an embodiment above, point 2 qualifies as a preliminary breakaway point.

Point 2 also meets the requirements of steps 250, 254, and 256 when the minimum start angle is 0.5 degrees and the minimum wrench rotation is 2 degrees.

A quick viewing of the graphical representation of the data of Table 2, namely the torque-angle curve of FIG. 19, seems to suggest that point 2 could indeed be a breakaway point. However, the curve also shows that the downward trending of data is relatively short-lived, and is followed by "rising" data points.

More specifically, although point 2 meets the criteria of a preliminary breakaway point, and even meets the requirements of steps 250, 254, and 256, point 2 does not qualify as an actual breakaway point, nor do any of the points within the subsequent-point window of point 2 qualify as actual breakaway points.

Points 2 through 8 comprise a seven-point subsequent point window of point 2, and each point corresponds to slope deltas equal to, or greater than the minimum slope delta of 60%, with the exception of points 7 and 8. Points 7 and 8 correspond to slope deltas of only 56% and 43%. Therefore, point 2 is considered a false breakaway point, and other points-under-test need be considered.

Similar to point 2, points 3 through 8 qualify as preliminary breakaway points, but fail to pass step 258.

Referring to points 9 through 15, none of these points qualify as preliminary breakaway points.

However, point 16 does qualify as a preliminary breakaway point with its slope delta of 66%. Furthermore, points 16 through 22 which comprise the subsequent-point window for point 16, all have slope deltas greater than the previously-defined minimum slope delta of 60%. Of these points 16 through 22, point 22 has the greatest slope delta, 95%, and is therefore via step 259 considered the actual breakaway point, subject to final confirmation at step 260.

In a variation of the subsequent-point window method described above, if only a few points in a row yield extremely high slope deltas, an actual breakaway point is identified.

In this embodiment, the subsequent-point window may comprise as few as three subsequent points, but requires a series of consecutive slope deltas significantly higher than the minimum slope delta. In one embodiment, the three sequential slope deltas must exceed 100% in order to identify an actual breakaway point. If three such sequential slope deltas exist, then the actual breakaway point is the highest torque value within a window of points surrounding the point-under-test ("surrounding window"). The surrounding window includes points previous to the point-under-test, and subsequent to the point under test. In one embodiment, the surrounding window includes ten data points: three data points captured prior to the point-under-test, the point-under-test, and six subsequent points. This method works well to capture the best breakaway point when the joint has a high degree of static friction to overcome, such as the joint associated with the torque-angle curve of FIG. 16. When this happens there is a sudden drop in the torque value when the fastener first breaks.

Step 258 may include the subsequent point method, surrounding window method, or both, to determine actual breakaway. In one embodiment, both the subsequent point method and the surrounding window are used, with the surrounding window method being the determinative method. In this embodiment, if several points with high slope deltas exist within a subsequent window, then the point with the highest measured torque is chosen from the surrounding window as the breakaway torque, as discussed above in accordance with the surrounding window method. If the surrounding window method fails to yield an actual breakaway point, the subsequent window method may be employed to search for an actual breakaway point.

If an actual breakaway point is identified at steps 258 and 259, using any of the methods described above, the actual breakaway point is confirmed at 260. At step 260, an "up-tick" must be identified in order to confirm the actual breakaway point.

It is assumed that an actual breakaway point is only valid if there is some tightening of the fastener after the breakaway occurs. Therefore there must be an up-tick following the actual breakaway point. Therefore, after an actual breakaway point is identified, there must be a torque value that is greater than the torque value immediately before it. This is called the up-tick. There must be an up-tick within a number of points defined by a restart window parameter following the actual breakaway point. If not, then the actual breakaway point cannot be confirmed.

In one embodiment, the restart window is defined in angular motion terms, rather than a number of data points. One such restart window, and one that may be used as a default setting within DCA 104, is 1.5 degrees, though the restart window may be adjusted to accommodate various joint characteristics or other needs.

The confirmation step of 260 prevents an actual breakaway point from being confirmed in the case of a short pull, or wrench slippage. A torque-angle curve will fail to have an up-tick if the operator does not pull the fastener to a confirmed actual breakaway point or if the wrench slips off the fastener.

In one embodiment, buzzer 212 and/or LED 138 alerts an operator that an actual breakaway point has been confirmed so that the operator can stop pulling on torque-angle wrench 102 so as to avoid unnecessary tightening of the fastener.

Referring to FIG. 15, in another embodiment, data analysis continues with a check for a restart point at step 244. The restart point is defined as the first torque-angle data point after the confirmed breakaway point having a torque value that is less than the torque value at the confirmed breakaway point, and that is followed by a subsequent point within the restart window that has a greater torque value than itself. This indicates the fastener is no longer slipping and is beginning to be tightened further.

As described above, the torque value of the restart point tends to be the better indicator of actual residual torque on a fastener. Accordingly, the torque value of the restart point, when available, is used to describe or define the residual torque of the fastener at test.

If a confirmed breakaway point has been detected and an up-tick was found but there is no restart point, the measured torque value at the confirmed breakaway point will be considered the residual torque on the fastener at test.

In one embodiment, torque analyzer 100 may include a time-out feature such that an operator will be alerted after a defined period of time following detection and confirmation of a breakaway point or at the end of the restart window, whichever comes first. In this case it is assumed that there was not enough static friction to cause a restart point and it is not necessary to continue looking for one.

Any or all of the measured torque-angle data points, slope deltas, torque-angle curves, and so on may be displayed by LCD display 210 for viewing by an operator. Such measured and interpreted data may also be stored on DCA 104, and/or communicated to external devices for further viewing and analysis as indicated previously with respect to FIG. 14. While the present invention has been shown and described in detail, the invention is not to be considered as limited to the exact forms disclosed, and changes in detail and construction may be made therein within the scope of the invention without departing from the spirit thereof.

What is claimed is:

1. A system for detecting fastener movement and measuring a residual torque in a fastener joint, comprising:

a device for applying torque to a stationary fastener in a tightened state and measuring torque and angle of rotation, the device comprising a sensing system that includes a gyroscope operably coupled to the device and adapted to provide a signal corresponding to the angle of rotation of the device as it applies torque to the fastener, and a torque transducer operably coupled to the device and adapted to provide a signal corresponding to the torque applied to the fastener by the device; and a computing unit in operable communication with the sensing system and adapted to receive the signal corresponding to an angle of rotation of the device and the signal corresponding to the torque applied to the fastener to define a plurality of torque-angle data points, and determine a torque at a time of initial movement of the fastener, wherein determining the time of initial movement of the fastener comprises: determining a base slope for at least one of the plurality of torque-angle data points, wherein the base slope comprises a change in torque over a change in angle for the at least one torque-angle data point and a base point;

determining a forward slope for the at least one torque-data point, wherein the forward slope comprises a change in torque over a change in angle for a point subsequent the at least one torque-angle data point and the at least one torque-angle data point;

determining a slope delta for the at least one torque-angle data point, wherein the slope delta comprises a rate of change between the forward slope and the base slope;

comparing the slope delta of the at least one torque-angle data point to a minimum slope delta.

2. The system of claim 1, wherein the angle of rotation signal is a quadrature angle of rotation signal.

3. The system of claim 1, wherein determining the torque at the time of initial movement further includes identifying and confirming a breakaway torque-angle point.

4. The system of claim 1, wherein the computing unit is further adapted to detect a restart torque-angle data point.

5. The system of claim 1, wherein the torque transducer comprises a strain gauge.

6. The system of claim 1, wherein the computing unit comprises a microcontroller.

7. The system of claim 1, further comprising a communication cable, wherein the communication cable coupled to the sensing system and the computing unit.

8. The system of claim 1, further comprising a display in communication with the computing unit, the display adapted to present measured torque-angle data points and identify a torque-angle data point corresponding to fastener movement.

9. The system of claim 1, wherein the computing unit is located within the device for applying torque.

10. The system of claim 1, wherein the device for applying torque further comprises a microcontroller adapted to modify the signal corresponding to the angle of rotation of the device such that the signal is a quadrature output signal that emulates the output of a rotary encoder.

11. A method of measuring residual torque in a previously tightened fastener, comprising:

applying torque to a previously tightened fastener using a device adapted to measure applied torque and angular motion;

measuring torque applied to the fastener at a plurality of sensed angular positions to obtain a plurality of torque-angle data points;

determining a base slope for at least one of the plurality of torque-angle data points, wherein the base slope comprises a change in torque over a change in angle for the at least one torque-angle data point as compared to a base point;

determining a forward slope for the at least one torque-data point, wherein the forward slope comprises a change in torque over a change in angle for a point subsequent the at least one torque-angle data point and the at least one torque-angle data point;

determining a slope delta for the at least one torque-angle data point, wherein the slope delta comprises a rate of change between the forward slope and the base slope;

comparing the slope delta of the at least one torque-angle data point to a minimum slope delta, thereby obtaining an indication of a rate of change of torque per unit of angular motion of the at least one torque-angle data point as compared to the plurality of torque-angle data points.

12. The method of claim 11, wherein the base point comprises a measured torque value and an angle value, such that the measured torque value is greater than a threshold torque.

13. The method of claim 11, further comprising identifying the at least one torque-angle data point as a preliminary breakaway point when the slope delta exceeds a minimum slope delta.

14. The method of claim 13, further comprising confirming the preliminary breakaway point as an actual breakaway point.

15. The method of claim 14, further comprising checking for a restart point subsequent the actual breakaway point, wherein the torque value of the actual breakaway point or the restart point is identified residual torque of the previously tightened fastener.

16. A device for applying torque to a fastener, comprising:

means for tightening a fastener in a fastener joint;

means for sensing angular movement of the means for tightening and providing a signal corresponding to the angle of rotation of the tightening means as it applies tightens the fastener;

means for sensing a torque applied to the fastener and providing a signal corresponding to the torque applied to the fastener by the means for tightening; and means for processing the signal corresponding to the angle of rotation and the signal corresponding to the torque applied to the fastener to determine a torque value corresponding to movement of the fastener, the means for processing including means for determining a slope delta for at least one of the plurality of torque-angle data points, the slope delta derived from a base slope and a forward slope, and means for comparing the slope delta to a predetermined minimum slope delta to determine whether the torque value corresponds to movement of the fastner.

17. The device of claim 16, wherein the torque value corresponding to movement of the fastener is a breakaway point.

18. The device of claim 16, wherein the torque value corresponding to movement of the fastener is a restart point.

19. The device of claim 16, further comprising:

means for displaying angle data sensed by the means for sensing angular movement; and means for displaying torque data sensed by the means for sensing torque.

20. The device of claim 16, further comprising means for communicating the determined torque value corresponding to movement of the fastener to a network.

21. A system for detecting fastener movement and measuring a residual torque in a fastener joint, comprising:

a device for applying torque to a stationary fastener in a tightened state and measuring torque and angle of rotation, the device comprising a sensing system that includes a gyroscope operably coupled to the device and transmitting a signal corresponding to the angle of rotation of the device as it applies torque to the fastener, and a torque transducer operably coupled to the device and transmitting a signal corresponding to the torque applied to the fastener by the device; and a computing unit in operable communication with the sensing system, the computing unit receiving the signal corresponding to an angle of rotation of the device and the signal corresponding to the torque applied to the fastener to define a plurality of torque-angle data points, including a base torque-angle data point and a point-under-test torque-angle data point, and identifying the point-under-test torque-angle data point as a preliminary breakaway point by determining a difference between a rate of change in torque over change in angle for the point-under-test torque-angle data point as compared to the base torque-angle data point and a rate of change in torque over change in angle for a first torque-angle data point subsequent the point-under-test torque-angle data point and the point-under-test data point.

22. The system of claim 21, wherein identifying the point-under-test torque-angle data point as a preliminary breakaway point includes comparing the first difference to a predetermined minimum value such that a first difference greater than the predetermined minimum value identifies the point-under-test torque-angle data point as a preliminary breakaway point.

23. The system of claim 22, wherein the predetermined minimum value is 60%.

24. The system of claim 21, wherein the data point subsequent the point-under-test torque-angle data point comprises a data point measured at a point in time later than the point-under-test torque-angle data point.

25. The system of claim 21, wherein the computing unit confirms the preliminary breakaway point as an actual breakaway point by determining a difference between a rate of change in torque over change in angle for the point-under-test torque-angle data point as compared to the base torque-angle data point and a rate of change in torque over change in angle for a second torque-angle data point subsequent the point-under-test torque-angle data point and the point-under-test data point, and confirming that the difference for the first torque-angle data point subsequent the point-under-test torque-angle data point and the difference for the second torque-angle data point subsequent the point-under-test torque-angle data point are both greater than a predetermined minimum value.

* * * * *

UNITED STATES PATENT AND TRADEMARK OFFICE

CERTIFICATE OF CORRECTION

PATENT NO. : 7,934,428 B2
APPLICATION NO. : 12/235263
DATED : May 3, 2011
INVENTOR(S) : Schultz et al.

It is certified that error appears in the above-identified patent and that said Letters Patent is hereby corrected as shown below:

Column 3, Line 31:
After "example" delete ")" and insert -- , --.

Column 4, Line 42:
After "slope" delete "L".

Column 6, Line 18:
Delete "function" and insert -- friction --.

Column 10, Line 60:
After "fastener" delete "on" and insert -- at --.

Column 18, Line 40:
After "cable" insert -- is --.

Column 19, Line 34:
Delete "applies".

Signed and Sealed this
Twentieth Day of December, 2011

David J. Kappos
*Director of the United States Patent and Trademark Office*